(12) United States Patent
Karthik

(10) Patent No.: US 11,068,873 B1
(45) Date of Patent: Jul. 20, 2021

(54) METHODS, SYSTEMS, APPARATUSES, AND DEVICES FOR FACILITATING ADVERTISING OF A PRODUCT

(71) Applicant: Krish Bala Karthik, Johns Creek, GA (US)

(72) Inventor: Krish Bala Karthik, Johns Creek, GA (US)

( * ) Notice: Subject to any disclaimer, the term of this patent is extended or adjusted under 35 U.S.C. 154(b) by 0 days.

(21) Appl. No.: 16/992,915

(22) Filed: Aug. 13, 2020

Related U.S. Application Data

(60) Provisional application No. 62/965,034, filed on Jan. 23, 2020.

(51) Int. Cl.
| | |
|---|---|
| *G06Q 20/20* | (2012.01) |
| *G06Q 30/02* | (2012.01) |
| *G09F 3/20* | (2006.01) |
| *A47F 5/08* | (2006.01) |
| *A47F 5/10* | (2006.01) |

(52) U.S. Cl.
CPC ......... *G06Q 20/208* (2013.01); *A47F 5/0869* (2013.01); *A47F 5/101* (2013.01); *G06Q 30/0276* (2013.01); *G09F 3/208* (2013.01)

(58) Field of Classification Search
CPC ... G09F 3/208; G06Q 20/208; A47B 47/0025; A47F 5/0869; A47F 5/101; A47F 5/00; A47F 5/0018
See application file for complete search history.

(56) References Cited

U.S. PATENT DOCUMENTS

| | | | | |
|---|---|---|---|---|
| 5,048,701 A * | 9/1991 | Simpson | ................... | A47F 5/00 211/189 |
| 5,255,803 A * | 10/1993 | Pavone | ..................... | A47F 5/00 211/189 |
| 5,415,301 A * | 5/1995 | Bruton | ............... | A47B 96/1416 211/183 |
| 5,529,192 A * | 6/1996 | Conen | .................. | A47B 96/028 211/187 |
| 5,622,010 A * | 4/1997 | Weber | ................... | A47F 5/0846 211/88.01 |
| 5,861,105 A * | 1/1999 | Martineau | ............. | E04B 2/8652 249/190 |
| 6,427,857 B1 * | 8/2002 | Adams | ..................... | A47F 5/10 211/162 |
| 9,339,125 B1 * | 5/2016 | Floersch | ................. | A47F 3/002 |
| 2007/0294926 A1 * | 12/2007 | Andersen | ............... | A47F 10/02 40/427 |

(Continued)

*Primary Examiner* — Gary C Hoge

(57) ABSTRACT

Disclosed herein is a shelf system for facilitating advertising of a product, in accordance with some embodiments. Accordingly, the shelf system includes a panel assembly, a sensor, and a display unit. Further, the panel assembly includes a base and a panel. Further, the panel assembly includes a lock mechanism and a cord hole. Further, a first panel assembly of the panel assembly is couplable to a second panel assembly of the panel assembly using the lock mechanism and the cord hole forming a spatial arrangement. Further, the lock mechanism and the cord hole facilitates securing and the transmission of the electrical power between the first panel assembly and the second panel assembly. Further, the sensor is configured for generating sensor data based on a position of an individual in relation to the panel assembly. Further, the display unit is configured for displaying information based on the sensor data.

12 Claims, 25 Drawing Sheets

(56) References Cited

U.S. PATENT DOCUMENTS

| | | | |
|---|---|---|---|
| 2011/0215212 A1* | 9/2011 | Keyvanloo | A47B 96/1466 |
| | | | 248/220.22 |
| 2015/0374145 A1* | 12/2015 | Lindblom | A47F 3/004 |
| | | | 211/187 |
| 2016/0078290 A1* | 3/2016 | Rambler | G07G 1/00 |
| | | | 382/103 |
| 2017/0148005 A1* | 5/2017 | Murn | G06Q 10/087 |
| 2020/0082740 A1* | 3/2020 | Schumacher | G06F 3/1446 |

* cited by examiner

METHODS, SYSTEMS, APPARATUSES, AND DEVICES FOR FACILITATING ADVERTISING OF A PRODUCT

The current application claims a priority to the U.S. Provisional Patent application Ser. No. 62/965,034 filed on Jan. 23, 2020.

FIELD OF THE INVENTION

Generally, the present disclosure relates to the field of supports racks. More specifically, the present disclosure relates to methods, systems, apparatuses, and devices for facilitating advertising of a product.

BACKGROUND OF THE INVENTION

Advertising and drawing the attention of consumers to different products in the retail industry may be difficult for the retail industry. The consumers browsing a store may come across a product that they have never seen before and may want to find additional information pertaining to the product, but the consumer may have no simple way of doing so. The consumer may use their smartphone and search up information about the product, but that simple task may be a hassle. The consumer may have a lack of information about the product which results in not knowing how to search for additional information about the product or the consumer may have no signal on their smartphone to search up additional information about the product. The retail industry may lack a method of informing and advertising for the consumer.

Therefore, there is a need for improved methods, systems, apparatuses, and devices for facilitating advertising of a product that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a shelf system for facilitating advertising of a product, in accordance with some embodiments. Accordingly, the shelf system may include at least one panel assembly, at least one sensor, and at least one display unit. Further, the at least one panel assembly may include at least one base and at least one panel. Further, the at least one panel may be vertically disposable in relation to the at least one base. Further, the at least one panel assembly may include at least one lock mechanism and at least one cord hole. Further, the at least one lock mechanism and the at least one cord hole may be disposed on the at least one panel and the at least one base. Further, the at least one panel may be couplable with the at least one base using the at least one lock mechanism and the at least one cord hole. Further, the at least one lock mechanism facilitates securing of the at least one panel to the at least one base. Further, the at least one cord hole facilitates transmission of an electrical power between the at least one panel and the at least one base. Further, a first panel assembly of the at least one panel assembly may be couplable to a second panel assembly of the at least one panel assembly using the at least one lock mechanism and the at least one cord hole forming at least one spatial arrangement. Further, the at least one lock mechanism facilitates securing of the first panel assembly to the second panel assembly in the at least one spatial arrangement. Further, the at least one cord hole facilities the transmission of the electrical power between the first panel assembly and the second panel assembly. Further, the at least one sensor may be disposed on the at least one panel assembly. Further, the at least one sensor may be configured for generating sensor data based on a position of at least one individual in relation to the at least one panel assembly. Further, the at least one display unit may be disposed on the at least one panel assembly. Further, the at least one display unit may be electrically powered. Further, the at least one display unit receives the electrical power from at least one electrical power source through the at least one cord hole. Further, the at least one display unit may be communicatively coupled with the at least one sensor. Further, the at least one display unit may be configured for displaying at least one information based on the sensor data. Further, the at least one display unit may include a display computer. Further, the display computer may be configured for running an artificial intelligence algorithm for detecting at least one of a gender, an age, a facial expression, and a number of the at least one individual present in front of a screen of the at least one display unit. Further, the display computer may be configured for generating analytics based on the detecting. Further, the display computer may report the analytics to a remote dashboard.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
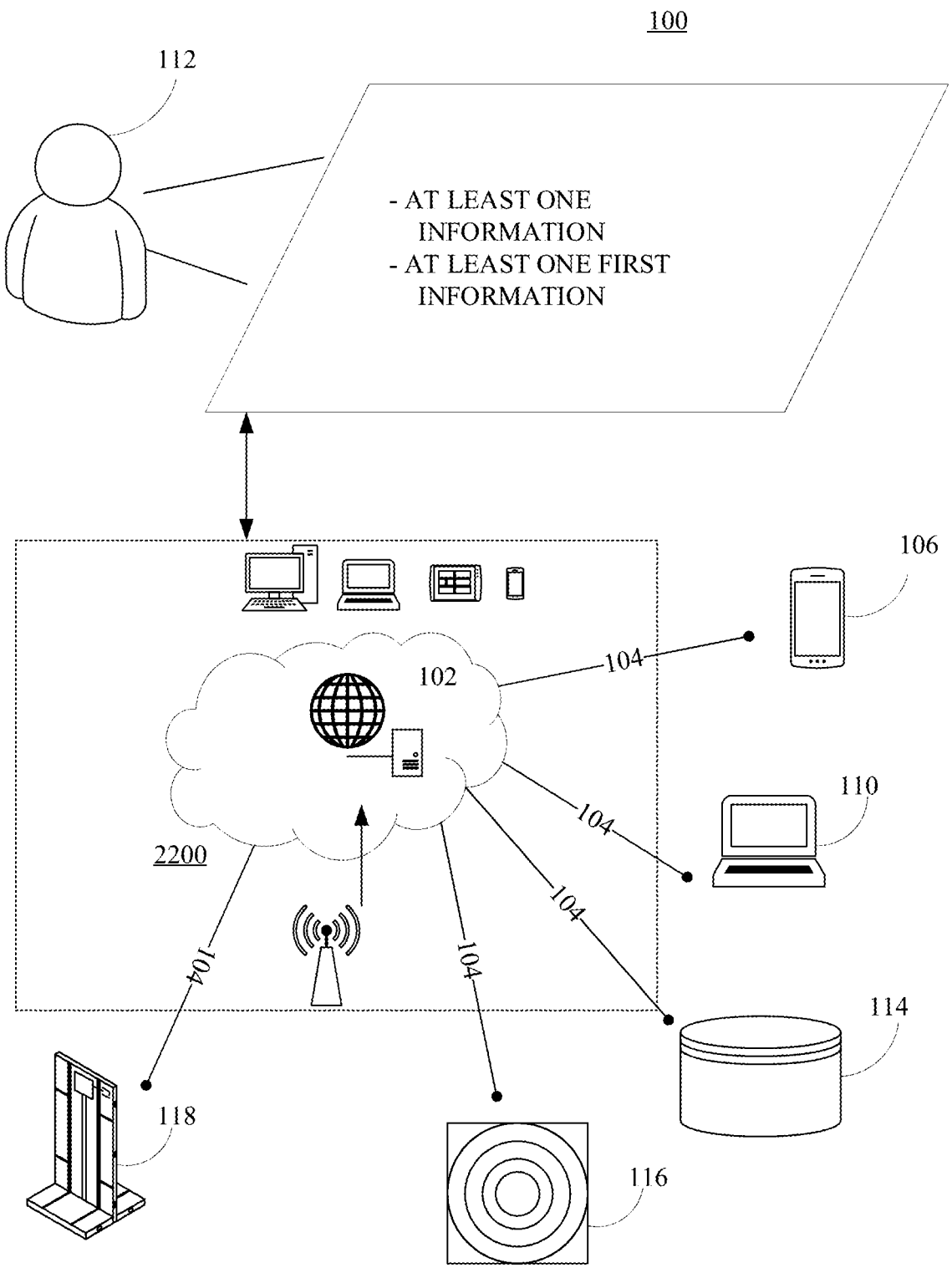
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses and devices for facilitating advertising of a product, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

Further, the present disclosure describes a retail shelf system that provides the user with an appealing and efficient way to advertise and inform products in the market to the consumers. The present disclosure describes a retail shelf system that comprises a plurality of panel assembly. The plurality of panel assembly further comprises a plurality of bases and panels, lighted clothes racks, and lighted shelves. The retail shelf system provides the user with the strategic placement of products and lightning to display the products on the shelves in an appealing manner to the consumers for advertisement purposes. The retail shelf system provides consumers branded light displays and lighted merchandise displays which draws the attention of the consumers to the presented product on the shelves. The lighted cloth racks illuminate merchandise to enhance visibility to the consumers. The lighted shelves eliminate shadows on the merchandise creating a more evenly lighted and pleasant display environment for the products on shelves. Further, the present disclosure describes that the shelves' lighting can be controlled wirelessly on/off and dimming purposes. The lighting is connected wirelessly by means of Wi-Fi or LoRa, and will depend on the ground situation; if the retail user will allow for their Wi-Fi infrastructure for this purpose, etc.

The present disclosure describes a system that provides the user with an efficient and low effort way of advertising the products on the shelves to the consumers. The retail shelf system comprises an LED display panel and Bluetooth beacon system that provide the consumer with an efficient way of obtaining additional information about the products on the shelves. Note that the Bluetooth beacon system is connected to the LED display panel through Bluetooth connection. The LED display panel will also incorporate a sonic sensor which will trigger advertisements based on a person standing in front of the screen and roughly detect the gender. The gender detection sensor is primarily used for advertising purposes as it will change the presented information on the LED display panel based on the consumer's gender. When the consumer lifts the product from the shelf, the Bluetooth beacon will be triggered, and the LED display panel will display the product information and any cross-sell or up-sell of other matching products just like an e-commerce site. Electronic price labels will also be connected to a server to manage the price of the products on the shelves. Retail analytics of product movement will be transmitted to the server. This system will also contain a modular shelving system with a knockdown fashion and can be configured in a myriad fashion.

The present disclosure describes a plurality of panel assemblies. The panel assembly comprises a first base, a second base, and a panel. The panel is made of a solid and sturdy material that is able to maintain shape when objects are mounted or placed onto it. The panel is a solid rectangular piece of wood. Further, the dimensions for the panel is 47 inches wide, 3 inches long, and 94 inches tall. Further, the panel may include roto locks (at least one lock mechanism). Further, the side view of the panel comprises a first female roto lock, a second female roto lock, a third female roto lock, a first male roto lock, a second male roto lock, and a third male roto lock. The female roto lock pockets and male roto lock pockets are used to attach a plurality of panel side by side. The male roto lock pockets are inserted into the female roto lock pockets to tightly secure the attachment between panels. Further, the female roto lock pockets and male roto lock pockets may be plugged in the panel when not in use so that the roto lock pockets are not protruding outwards of the panel for multiple reasons such as safety purposes. The size of each roto lock is 2.76 inches tall and 0.89 inches wide. The height of the roto locks is parallel with the height of the panel. Further, one side of the panel with a first male roto lock, a first female roto lock, and a second female roto lock. The roto locks are evenly spread apart from one another. The first male roto lock is located in the center of the panel's side with first female roto lock exactly 32.12 inches above the first male roto lock and second female roto lock exactly 32.12 inches below the first male roto lock. Further, on the opposite side of the panel comprised of the same components of three evenly spaced roto locks such that the third female roto lock is placed in the center of the panel's side with second male roto lock exactly 32.12 inches above the third female roto lock and the third male roto lock exactly 32.12 inches below the third female roto lock. Note that all of the roto locks' height on the side of the panel are parallel with the height of the panel. The front of the panel comprises a cord hole, a fourth female roto lock, a fifth female roto lock, a first shelf crevice, and a second shelf crevice. The cord hole is centered at the bottom front face of the panel. The cord hole is 2.25 inches tall and 3.25 inches wide. The fourth female roto lock is located on the bottom front face of the panel. The fourth female roto lock is the same dimensions as the side of the panel, 2.76 inches tall and 0.89 inches wide. The fourth female roto lock is 15.13 inches apart from the cord hole. The fifth female roto lock is located on the opposite end of the fourth female roto lock. The fifth female roto lock is 15.13 inches apart from the cord hole. The first shelf crevice and second shelf crevice run parallel with the height of the panel. The first shelf crevice is located 11.75 inches away from the outer edge of the panel and the second shelf crevice is located 11.75 inches away from the opposite outer edge of the panel. The first shelf crevice and the second shelf crevice are 23.50 inches apart from each other. The first shelf crevice and second shelf crevice are exactly 11.75 inches from the center of the panel. The first shelf crevice and the second shelf crevice are 0.55 inches wide. The first shelf crevice and second shelf crevice are used to hold lighted clothes racks and lighted shelves. Further, the base is made of a solid and sturdy material that is able to maintain shape when objects are mounted or placed onto it. The base is a solid rectangular piece of wood. Further, the dimensions for the base are 47 inches wide, 22.38 inches long, and 3 inches tall. The base comprises a second cord hole, a third cord hole, a fourth cord hole, a fourth male roto lock, and a fifth male roto lock. Further, the base comprises a first cord hole and a second cord hole. The first cord hole is centered on one side of the base. In respect to the first cord hole, the second cord hole is located on the opposite side of the base. The first cord hole and the second cord hole have the same dimensions, 3.25 inches in height and 2.25 inches in width. Further, the back of the base comprises a first male roto lock, a second male roto lock, and a third cord hole. The third cord hole is centered on the backside of the base. The dimensions for the third cord hole are 2.00 inches in height and 3.00 inches in width. The first male roto lock is located 15.26 inches away from the third cord hole. The second male roto lock is also located 15.26 inches away from the third cord hole but on the opposite side to the first male roto lock. The first male roto lock and the second male roto lock mirror the third cord hole, meaning the first male roto lock and the second male roto lock are on opposite ends on the back of the base. The dimensions for the first male roto lock and second male roto lock are identical, 0.64 inches tall and 2.76 inches wide. Further, the cord holes are used to connect the shelves with AC or DC power to power the shelf system's lighting and LED display panels. It is also important to note that all the male/female roto locks are used to tightly secure the components of the shelf system together. For example, the male/female roto locks are used to connect panels and bases together. In addition, the male/female roto locks are also used to secure a plurality of panel assemblies together to produce the shelf system. The plurality of panel assembly a plurality of lighted horizontal clothes rack, a plurality of lighted shelves, a plurality of further comprises lighted single cloth racks, a plurality of lighted display panels, and a plurality of Bluetooth beacons. To make it simpler, a single panel assembly will be described. A panel assembly further comprises optional attachments such as a lighted horizontal clothes rack, a lighted shelf, a lighted single clothes rack, a lighted display panel, and a Bluetooth beacon. The first crevice and second crevice of the panel are used as placement holders for the optional attachment on the retail shelf system. Depending on what the user is presenting to the consumer, there are numerous combinations in which the lighted clothes racks, lighted shelves, LED display panels, and Bluetooth beacons can be arranged. Further, the display panel may be played at the top of the panel followed by a shelf and Bluetooth beacon under the display panel. Under the shelf, two single clothes racks are placed as the first single clothes rack is protruding outwards from the first crevice and the second single clothes rack is protruding outwards from the second crevice. Further, optional attachments are arranged in a great deal of combinations.

Further, the present disclosure describes an integrated point of sale (POS) device. The POS device will include a barcode scanner, a magnetic stripe reader, a near field communication (NFC) based card swipe and reader, and a thermal receipt printer. The POS device will allow the consumers to skip checkout lines and purchase the products found on the smart shelf system. The POS device will be located beside the panels of the smart shelf system. The consumer will simply take the product to be purchased to the POS device. The consumer will scan the barcode label of the product with the barcode reader on the shelf. After scanning the product, the panel will display the price of the product on the screen. The display will interact with the consumer to scan more items or lead the consumer to make a payment. The consumer will need to make a payment through a card with magnetic stripes, such as a credit or debit card. The consumer will swipe their card through the NFC based card swipe and reader. After the POS device successfully accepted the consumer's payment, a receipt will be printed for the user by the thermal printer next to the POS device. The POS device enables consumers to skip check out lines and pay where they shop instead of waiting in line to check out near the exit of the store.

Further, the present disclosure describes the shelf system that provides users an easy and appealing way to advertise and inform consumers of the products that are on shelves in the retail industry. Further, the present disclosure describes the shelf system that provides the user with a simple and efficient method of advertising and informing the consumers about the products the users want to sell by the usage of LED display panels. In addition to advertising and informing the consumers about the user's products by the usage of LED display panels, the present disclosure describes the shelf system that comprises a plurality of Bluetooth beacons to assist with providing consumers additional information about the user's products. Further, the present disclosure describes the shelf system that comprises of lighted clothes racks and lighted shelves to assist in appealingly presenting the user's product.

Further, the present disclosure relates generally to retail shelves specifically aimed to provide the user with an efficient way to advertise products to the consumers. Further, the present disclosure describes the retail shelves that provide the user with an appealing method of presenting different products within the retail industry. Further, the present disclosure describes the retail shelves that provide an information display panel to inform consumers about the products.

Further, the shelves are modular and can form multiple configuration while running power sources through the base and connectors to daisy chain multiple units. Led lighting under racks. Further, a custom PCB board may be embedded into the shelves to accommodate 6 RFID, 6 Load cell and a sonic sensor and touch sensor to provide different customer interaction and experiences. Further, the shelves may use BLE beacons for proximity marketing. Further, the shelves may wirelessly send information to the IOT gateway (Raspberry Pi on the display). This module communicates to a server application hosted remotely and pull the product information to display to the customer. Further, the present disclosure describes integration of 3D camera/RGB camera to read people count, gesture recognition and engagement analytics to a cloud dashboard for analytics. The base may integrate a Lithium Iron Phosphate battery that may charge and stay wireless of power supply to power the tracks and electronics for over 10 hours.

Further, the present disclosure describes the shelf system that uses the facial recognition process. Further, the facial recognition process may be employed by executing an algorithm. There are three Phases, in this recognition process i.e., Training the model, Training, and Testing of Faces. In the Training Phase, the person's face is taken from the picture by using a custom detector and applying some image pre-processing techniques and store them in the database. Whereas in Testing Phase, the detected face from a CCTV camera is cropped and aligned, and the training and testing images are compared using a pre-defined weighted distance function. If the images are similar, it will recognize the person and if the images are not similar then the image is an unknown image. Data collection can be stated as the process of gathering and measuring information on variables of interest, in an established systematic fashion that enables one to answer stated research questions, test hypotheses, and evaluate the outcomes of the project. Nearly 20,000 images of Indian movie actors with different makeups at different angles is collected and labeled with the ground truth boxes with (x,y,w,h) coordinates. In order to make a universal face detector, the data is collected from different IP cameras at different angles. Further, the pre-processing is done in two ways, one way is to clean the dataset before labeling in order to make an ideal dataset and the other process will be held after face detection. Since the face detection model aligns the face itself after cropping make a color conversion i.e., from BGR to RGB image since for BGR images while loading in python and filters is applied which removes motion blur in images. The filter used here to detect and remove the motion blur in images is the local binary patterns (LBP) which is a visual descriptor in computer vision. The internal function flow of the LBP filter shows that the LBP operator the 3*3 surroundings of a pixel in an image and mark the binary value as "1" for the neighbor of the center pixel if it is greater than the center pixel otherwise it is marked as "0". And a component-wise multiplication is done with a matrix whose neighboring values are in the form of 2p. Then the representation will become the unsigned integer matrix whose values will show when the binary code of the previous matrix is "1". Finally, a summation is done on the overall pixel matrix in order to obtain the dominant features of the image. The formula for calculating the local binary patterns for the entire image can be expressed as, $LBP_{p,R}(x_c,y_c)=s(g_p-g_c)\cdot 2^P$ Equation 1, where (gp-gc) is the difference between gray level center and neighboring pixels and "s" is the step function in order to make data invariant. Face Detection system plays a prominent role not only in identifying faces in an image but also helps in extracting features of a particular face after detection, cropping and aligning which helps in identifying whether the person belongs to the office or he is just a visitor and so on from the generic attendance system to the security regions by spreading its wings in order to find the criminal in a crowded area.

Algorithm 1: Face Detection in an image
Basic Steps in Identifying Faces in an Image
Input: x image with a sliding window approach for Feature Extraction
1: W:=In all rectangles if r∈R (Region of proposal) for f(x,r)
2: Sort W such that W1≥W2≥W3 . . . ≥Wn
3: Output Y*={ }
4: for i in range (1 to W):
5: if Wi doesn't overlap with any rectangles then
6: Y=Y U Wi
7: end if
8: end
9: Detected Rectangles of the Faces in an image In the basic face detection algorithm, a sliding window approach is taken on an image where a 3*3,6*6 and so on can be taken as a stride and move across the image in both horizontal and vertical directions and obtain the features of the region using either haar like features or HoG features in order to obtain the positive and negative windows. A binary classifier is used at the end in order to differentiate whether it is a positive window or a negative window i.e., the window contains the face like features or not. And at the end, a Non-Maximum Suppression (NMS) technique is used in order to make two boxes not overlap with each order if the ratio of their intersection area to the total area covered is less than 0.5. With the presence of standard deep learning classification frameworks which is used instead of binary classifiers increases the percentage of accuracy in the real-time scenarios. The percentage of accuracy in detection and False positive rate of different classifiers can be explained with the help of the standard mathematical expressions. $F=\Pi_{i=1}^{k}(fi)$ Equation 2, where, F is a false positive rate where fi is the maximum acceptance of false-positive rate and $D=\Pi_{i=1}^{k} di$ Equation 3, where, D is Detection rate where di is the maximum detection rate of faces in an image. Further, in a face detector, a fully connected network (FCN) which is made up of only convolution layers and up-sampling is used. It uses three different strides in three different areas helping in securing the low-level features obtained after pooling. Further, in the algorithm, the image is split into some S*S grid cells and the object is predicted if the center of the object falls into that cell. Each grid cell predicts components that are the coordinates of the bounding boxes (which has to be normalized to [0,1]) and the probability of the class object (here only one class that is face so there will be one set of probability that falls in between [0 to 1]). So the formula in detecting an object in a feature map with S*S grid cells with 5 components as describe above can be shown as [s*s*(B*(5+C))] Equation 4, Where C is the number of classes (for a case C=1) and the five components can be explained in terms of mathematical expressions as shown below, $$b_x=\sigma(t_x)+C_x \qquad \text{Equation 5}$$

$$b_y=\sigma(t_y)+C_x \qquad \text{Equation 6}$$

$$b_w=p_w\exp(t_w) \qquad \text{Equation 7}$$

$$b_h=p_h\exp(t_h) \qquad \text{Equation 8}$$

$$(\text{object})=\sigma(t_o) \qquad \text{Equation 9}$$

where tx,ty,tw,th are the coordinates of the bounding boxes whose values should lies in between [0 to 1] and Pr(object) is the probability of the detected object depending upon the center grid cell. By, using a 1*1 kernel or a grid cell in a feature map in order to find the object in an image the whole equation will falls as [1*1*(B*(5+C))] Equation 10. The probability of the individual class (Confidence) can be defined as the multiplication of the probability of the object and the Intersection over union of the predicted and the ground truth boxes, i.e., Pr(Object)*IoU(predicted, Ground Truth values). Assuming B=3, then a kernel size of 1*1*18 is obtained.

In real-time, as the detection of an object through camera depends upon the camera focal length and distance, ie., whether the object is far from camera or near to the camera resulting in 90 percent occupancy of an image or 60 percent occupancy or 30 percent occupancy in an image and so on. Considering 3 strides in three different regions ie., at 13*13, 26*26, and 52*52 layers for detecting smaller, medium, and larger objects. Due to consideration of 3 strides at three different regions to get 9 anchor boxes at them which is clustered using K-means Clustering. And the number of bounding boxes in an image depends upon the occupancy of the likely class in the image. ie., if it is a small image then the bounding box will be 13*13*18 and if it is medium then the number of bounding boxes per image will be 26*26*18 and 52*52*18 for large object respectively.

Further, the loss function of the deep learning face detection architecture is best explained in terms of three basic loss parameters based on the objects, their coordinates, and classes with their probabilities.

The First Part, $$\lambda_{coord} \sum_{i=0}^{s^2} \sum_{j=0}^{B} 1_{ij}^{obj}(x_i - x_i^!)^2 + (y_i - y_i^!)^2 \quad \text{Equation 11}$$

In the above equation, λcoord is a parametric constant where (x,y) is the expected bounding box position of the object, and (x!,y!) is the actual position of the target object. 1obj is defined as the detection of objects in ith cell in jth bounding box. Similarly, the second part of the loss function can be expressed as, $$\lambda_{coord} \sum_{i=0}^{s^2} \sum_{j=0}^{B} 1_{ij}^{obj}\left(\sqrt{w_i} - \sqrt{w_i^!}\right)^2 + \left(\sqrt{h_i} - \sqrt{h_i^!}\right)^2 \quad \text{Equation 12}$$

Where "w" and "h" are the width and height of the bounding boxes and square root indicates detection of small deviation in width and height of the small and large bounding boxes.

$$\left(\sum_{i=0}^{s^2} \sum_{j=0}^{B} 1_{ij}^{noobj}(c_i - c_i^!)^2 + \sum_{i=0}^{s^2} \sum_{j=0}^{B} 1_{ij}^{obj}(c_i - c_i^!)^2\right) \quad \text{Equation 13}$$

In the above equation, C is the confidence and C! Is the Intersection over Union of the predicted bounding box and 1obj is similar to that "1" if an object is detected otherwise "0" and 1noobj is exact opposite to the 1obj, for all the cells from (i=0 to S2) in all the predicted bounding boxes from (j=0 to B). The last part of the loss function is the classification loss which is shown in equation 8 below.

$$\sum_{i=0}^{s^2} 1_{ij}^{obj}(p_i(c) - p_i^!(c))^2 \quad \text{Equation 14}$$

In the above equation, look likes sum squared difference of the conditional probabilities, where pi(C) indicates the conditional probability of the class detected in the i th cell.

So the overall loss function for the face detection algorithm will be the sum of all the equations (11 to 14) which looks like, $$\lambda_{coord}\sum_{i=0}^{s^2}\sum_{j=0}^{B} 1_{ij}^{obj}(x_i - x_i^!)^2 + (y_i - y_{ia}^!)^2 + \\ \lambda_{coord}\sum_{i=0}^{s^2}\sum_{j=0}^{B} 1_{ij}^{obj}\left(\sqrt{w_i} - \sqrt{w_i^!}\right)^2 + \\ \left(\sqrt{h_i} - \sqrt{h_i^!}\right)^2 + \sum_{i=0}^{s^2}\sum_{j=0}^{B} 1_{ij}^{noobj}(c_i - c_i^!)^2 + \\ \sum_{i=0}^{s^2}\sum_{j=0}^{B} 1_{ij}^{obj}(c_i - c_i^!)^2 + \sum_{i=0}^{s^2} 1_{ij}^{obj}(Pi(c) - p_i^!(c))^2 \quad \text{Equation 15}$$

Feature extracting is a very important step in the face recognition system. The recognition rate of the system depends on the meaningful data extracted from the face image. If the features belong to the different classes and the distance between these classes is bigger then these features are important for recognition of the images. In general, they are two types of techniques used for Feature Extraction. They are the Traditional approach and Deep Learning approach. In the traditional approach feature extraction from the face is done in 4 kinds of approaches. They are geometry-features, holistic, feature-based and hybrid methods. Geometric based models use a specialized edge and contour detectors to find the location of a set of facial landmarks and to measure relative positions and distances between them. Whereas, Holistic approach such Principal Component Analysis (PCA), Linear Discriminant Analysis (LDA), Local Preserving Positions (LPP) and Independent Component Analysis (ICA) are used in order to project face images onto a low-dimensional space that discards superfluous details and variations not needed for the recognition task. Unlike geometry-based methods, feature-based methods focus on extracting discriminative features rather than computing their geometries. They are SIFT, SURF, Brisk, ORB, and so on. Later they use chi-squared distance to compare these facial features collected in the database. A Hybrid model combines two or three models such as Holistic and Feature-based or Holistic and Geometric based and soon in order to extract these features and later compare them using classifiers and other distance metrics. As these 4 traditional approaches are very fast in extracting and comparing the encodings between the faces they are not very robust in real-time. Hence with the advancement of technology neural networks lead the role in extracting the facial features and comparing them in real-time with the help of some classifiers and distance metrics giving a breakthrough in the Face Recognition system. With the improvements in deep learning architecture, there are four milestone systems on deep learning for face recognition that drove these innovations came through. They are Deep Face, the Deep ID series of systems, VGGFace, and Face-net. All these milestone architectures are trained with millions and millions of face recognition databases which requires huge servers, months, and months of training periods which is unrealistic for most of the face recognition system designers. Hence a new holistic approach in the Face recognition system which uses a network architecture that is designed in order to directly compare the faces in real-time without any delay. Further, the feature extraction technique used squeezes layers of two deep learning architectures into one model with the help of a softmax activation function in the Dense Layers. L2 normalization technique or Euclidean normalization technique is used above the softmax layer in order to calculate the distance of the vector coordinate from the origin of the vector space which is a positive distance value Convolution is the first layer of the model to extract features from an input image. It preserves the relationship between pixels by learning image features using small squares of input data. It is a mathematical operation that takes two inputs such as image matrix and a filter or kernal that generates "Feature Maps" as outputs. In the process, the cropped face image is taken from the custom detector and resize it into the shape of (64,64,3) and taken a stride or kernel of (5*5) which strides across five pixels on the image matrix (both in h & w direction) and generates the feature maps according to the formula $$\text{Feature Maps} = (h - fh + 1)(w - fw + 1) * 1 \qquad \text{Equation 16}$$

where, h,w is the height and width of the image and fh, fw is the height and width of the kernel.

So according to the Formula 60*60 feature maps are generated with the dimensions of the image and the size of the kernel. In order to introduce non-linearity, a Rectification Linear Unit (Relu) activation function is used in the convolution layer which gives only non-linear values. The formula and the functional graph for the Relu function are shown in the eqn., 17. Batch normalization layer is the next layer of the model, that is used after the convolution layer in order to reduce the covariance shift. That is the change in the distribution of activation of a component. By using BN, each neuron's activation becomes (more or less) a Gaussian distribution, i.e. its usually not active, sometimes a bit active, rare very active. Covariate Shift is undesirable because the later layers have to keep adapting to the change of the type of distribution (instead of just to new distribution parameters, e.g., new mean and variance values for Gaussian distributions). BN reduces the effects of exploding and vanishing gradients. Without BN, low activations of one layer can lead to lower activations in the next layer, and then even lower ones in the next layer and so on. The process of normalization inputs to either the range of [0, 1] or [−1, 1] or to mean=0 and variance=1. The latter is called Whitening.

The basic formula for Batch Normalization is shown in eqn., 18

$$\text{ie., } x^* = (x - E[x])/\sqrt{\text{var}(x)} \qquad \text{Equation 18}$$

Where x* is the new variable and E[x] is the mean of the input variable. BN extends that formula further to x**=gamma*x*+beta, where x** is the final normalized value. "gamma" and "beta" is learned per layer. Now Max-Pooling Layer down samples network to (14,14,64) since a pool size of (3*3) is used in order to reduce the overfitting.

Taking a 4*4 image matrix in which a (2*2) pooling filter is slid. For every pool, it takes the maximum value in the image matrix (hence the name Max-Pooling), which means it downsamples the 4*4 image matrix into 2*2 image matrix with the help of a pooling layer. The formula for Max-Pooling layer will be as shown in the eqn., 19 below, $$p_i, m = \max_{n=1}^{G} q_i, (m-1)*s + n \qquad \text{Equation 19}$$

Repeating the above three layers until a final convolution layer for the base model in the shape of (2*2*512) is achieved and the last convolution layer is flattened in order to convert the three-dimensional tensor to a one-dimensional tensor matrix which is followed by the dense layers or fully connected layers which perform classification on the features extracted by the convolution layers and downsampled by the pooling layers. In a dense layer, every node in the layer is connected to every node in the preceding layer and the final output will be, output=activation(dot(input, kernel)+bias) where activation means the activation function which is sigmoid here, which gives the 128-D output features of the face.

$$f(x) = 1/((1 + e^{\hat{}}(-x))) \qquad \text{Equation 20}$$

Further, the present disclosure describes the retail shelf system that uses a facial expression recognition method. Further, the Facial Expression database of nearly 600 for each individual is collected from movies and Google images by splitting them into frames and the caffee model is used in order to crop the face regions out from the movie frames and saved them into their respective folders, whose names are represented as labels for the dataset. After Extracting faces into the folders an image recursive algorithm is used to retrieve all the images and applied Local Binary Patterns for the faces for texture feature extraction. Further, pre-processing techniques such as DCT, DWT, Haar-like Features and LBP, LDP, and LTP may be used. Further, the LBP may be used as it yields better performance with Deep Convolution Neural Networks, instead of LBPH and SVM classifiers. In the Pre-processing technique, the size of the image is converted to (64*64) and Local Binary Patterns with size (8*8) pixels are applied which were compared with 8 surrounding neighbors for texture feature extraction and the resultant data is appended to a list which will be later on converted to a numpy array. After extracting the texture patterns from the images the labels according to the names of the folders are created and one hot encoding is used to convert those labels into binary vectors. Let Y be a vector containing elements {y0, y1, y2, y3, y4, y5, y6}. After converting the labels into one-hot encodings, the data and labels are split into a training set and test set with a random seed of 40 and fit it to the Deep learning convolution model. The Architecture of the Deep Convolution Network consists of two convolution layers having 5*5*3 filters which stride over the complete image and take the dot product with the chunk of the image resulting 'k' feature maps whose value is equal to m−n+1. Where m=size of the image (either width/height), n is the size of the filter and the resulting value will be the k feature maps. In the network, as the image size is 64*64 and the filter size is 5*5*3, the resulting feature maps generated will be 60 feature maps. So the size obtained from the output of the first convolution layer will be (64*64, 60), i.e., 60 feature maps of size 64*64. Rectification linear unit (ReLu) activation function is used in the convolution layers so as to provide some non-linearity in the output function by keeping all the negative values obtained in the neurons to zeros. After convolution layer, the subsamples from all the 60 feature maps are taken using maximum pooling function (size=2*2), in order to reduce the spatial representation (i.e., from (64*64,60) to (32*32,60)), which alternatively reduce the computational parameters thus reducing the computational complexity of the network. Further, one more convolution layer is added which defines the size of the new feature maps in the range of m+n−1 (whereas, m=32, n=5) and again maxpooled to the shape (16*16,28). The flatten layer now converts the three-dimensional tensor into a mono-dimensional tensor by converting (16*16,28) into a (16*16*28) single dimension feature vector of size 7168 units. Dense layers are the fully connected layers which was used in the network before implying "softmax" classifier to determine the computational probabilities of each class. Once the model gets trained, Keras model along with the labels is saved and the model is compared with the test set containing images of different Facial Expressions.

FIG. 1 is an illustration of an online platform 100 consistent with various embodiments of the present disclosure. By way of non-limiting example, the online platform 100 to facilitate advertising of a product may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116, and a shelf system 118 (such as a shelf system 200, a shelf system 2100, etc.) over a communication network 104, such as, but not limited to, the Internet. Further, users of the online platform 100 may include relevant parties such as, but not limited to, end-users, individuals, administrators, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 2200.

Figure 2:
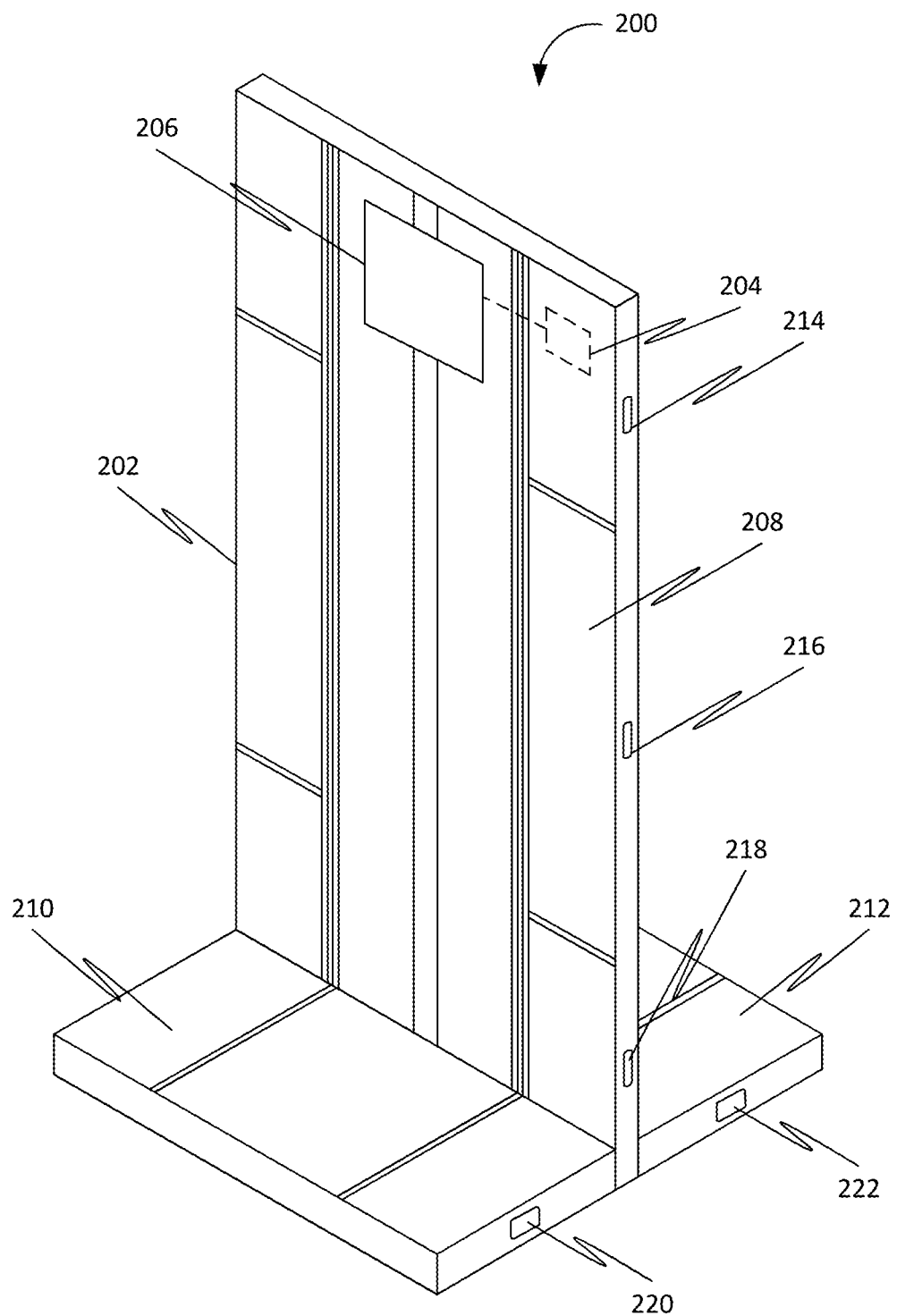
FIG. 2 is a perspective view of a shelf system for facilitating advertising of a product, in accordance with some embodiments.

FIG. 2 is a perspective view of a shelf system 200 for facilitating advertising of a product, in accordance with some embodiments. Further, the shelf system 200 may include at least one panel assembly 202, at least one sensor 204 (such as the sensors 116), and at least one display unit 206.

Further, the at least one panel assembly 202 may include at least one base 210-212 and at least one panel 208. Further, the at least one panel 208 may be vertically disposable in relation to the at least one base 210-212. Further, the at least one panel assembly 202 may include at least one lock mechanism 214-218 and at least one cord hole 220-222. Further, the at least one lock mechanism 214-218 and the at least one cord hole 220-222 may be disposed on the at least one panel 208 and the at least one base 210-212. Further, the at least one panel 208 may be couplable with the at least one base 210-212 using the at least one lock mechanism 214-218 and the at least one cord hole 220-222. Further, the at least one lock mechanism 214-218 facilitates securing of the at least one panel 208 to the at least one base 210-212. Further, the at least one cord hole 220-222 facilitates transmission of an electrical power between the at least one panel 208 and the at least one base 210-212. Further, a first panel assembly of the at least one panel assembly 202 may be couplable to a second panel assembly of the at least one panel assembly 202 using the at least one lock mechanism 214-218 and the at least one cord hole 220-222 forming at least one spatial arrangement. Further, the at least one spatial arrangement may include a Z-shaped spatial arrangement, a W-shaped spatial arrangement, a U-shaped spatial arrangement, etc. Further, the at least one lock mechanism 214-218 facilitates securing of the first panel assembly to the second panel assembly in the at least one spatial arrangement. Further, the at least one cord hole 220-222 facilities the transmission of the electrical power between the first panel assembly and the second panel assembly.

Further, the at least one sensor 204 may be disposed on the at least one panel assembly 202. Further, the at least one sensor 204 may be configured for generating sensor data based on a position of at least one individual (such as the user 112) in relation to the at least one panel assembly 202.

Further, the at least one display unit 206 may be disposed on the at least one panel assembly 202. Further, the at least one display unit 206 may include a LED display panel. Further, the at least one display unit 206 may be electrically powered. Further, the at least one display unit 206 receives the electrical power from at least one electrical power source through the at least one cord hole 220-222. Further, the at least one electrical power source may include a battery, a power supply, etc. Further, the at least one display unit 206 receives the electrical power from a power cord of the at least one electric power source. Further, the power cord may be disposed in the at least one base 210-212. Further, the at least one display unit 206 may be communicatively coupled with the at least one sensor 204. Further, the at least one display unit 206 may be configured for displaying at least one information based on the sensor data. Further, the at least one information may include at least one digital content. Further, the at least one digital content may be associated with the product. Further, the at least one digital content may include at least one of visual content, aural content, and a haptic content. Further, the visual content may include at least one image. Further, the at least one image may include a 2-D image, a 3-D image, etc. Further, the aural content may include at least one sound. Further, the at least one sample may include a voice sample, a music sample, etc. Further, the at least one display unit 206 may include a display computer. Further, the display computer may be configured for running an artificial intelligence algorithm for detecting at least one of a gender, an age, a facial expression, and a number of the at least one individual present in front of a screen of the at least one display unit 206. Further, the display computer may be configured for generating analytics based on the detecting. Further, the display computer may report the analytics to a remote dashboard.

Further, in some embodiments, the at least one lock mechanism 214-218 may include at least one first part and at least one second part. Further, the at least one first part may be disposed on at least one first side of the at least one panel 208 proximal to a first end of the at least one panel 208. Further, the at least one second part may be disposed on a first side of the at least one base 210-212. Further, the at least one first part may be configured for receiving the at least one second part. Further, the at least one first part may be couplable to the at least one second part for facilitating securing of the at least one first side of the at least one panel 208 to the first side of the at least one base 210-212.

Further, in some embodiments, the at least one cord hole 220-222 may include at least one first cord hole and at least one second cord hole. Further, the at least one first cord hole may be disposed on at least one first side of the at least one panel 208 proximal to a first end of the at least one panel 208. Further, the at least one second cord hole may be disposed on a first side of the at least one base 210-212. Further, the at least one first cord hole may be couplable with the at least one second cord hole for facilitating the transmission of the electrical power between the at least one base 210-212 and the at least one panel 208.

Further, in some embodiments, the at least one lock mechanism 214-218 may include at least one first part and at least one second part. Further, the at least one first part may be disposed on at least one primary side of at least one first panel of the first panel assembly. Further, the at least one second part may be disposed on at least one secondary side of at least one second panel of the second panel assembly. Further, the at least one first part may be configured for receiving the at least one second part. Further, the at least one first part may be couplable to the at least one second part for facilitating securing of the at least one primary side of the first panel assembly to the at least one secondary side the second panel assembly forming the at least one spatial arrangement.

Further, in some embodiments, the at least one cord hole 220-222 may include at least one primary cord hole and at least one secondary cord hole. Further, the at least one primary cord hole may be disposed on at least one primary side of at least one first base of the first panel assembly. Further, the at least one secondary cord hole may be disposed on at least one secondary side of at least one second base of the second panel assembly. Further, the at least one primary cord hole may be couplable with the at least one secondary cord hole for facilitating transmission of the electrical power between the first panel assembly and the second panel assembly.

Figure 3:
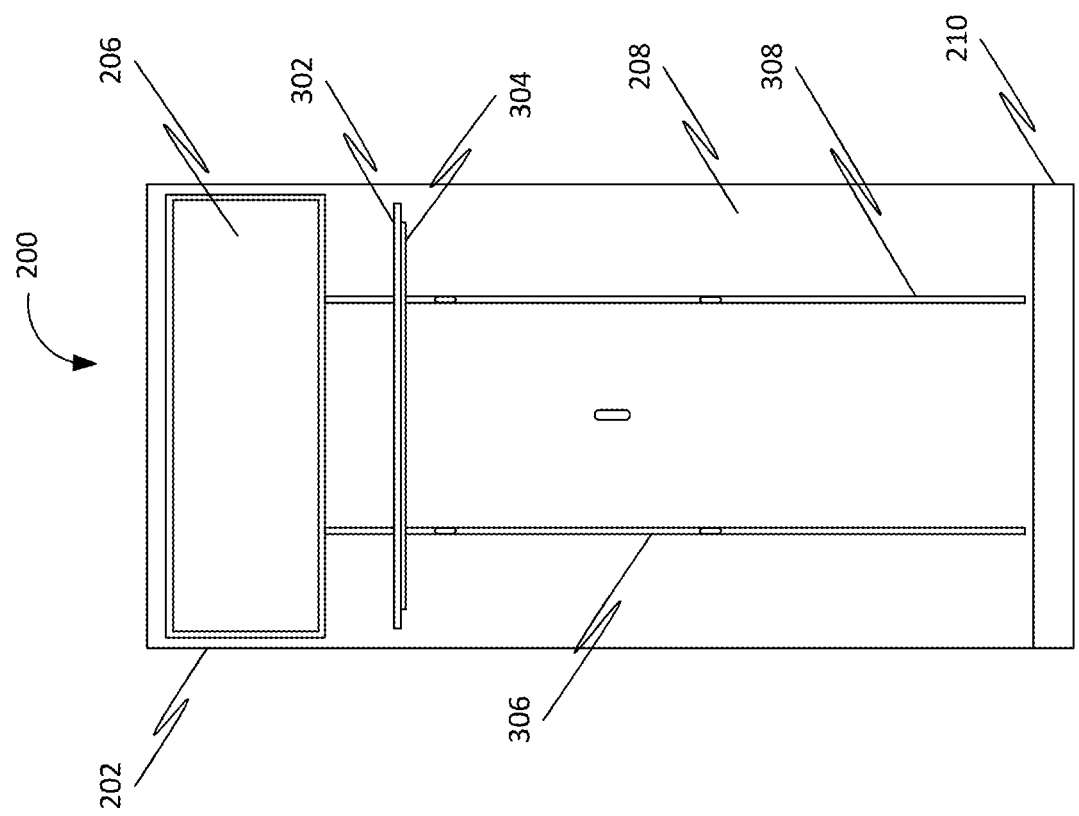
FIG. 3 is a front view of the shelf system for facilitating advertising of a product, in accordance with some embodiments.

In further embodiments, at least one rack 302, as shown in FIG. 3, may be coupled to the at least one panel assembly 202. Further, the at least one rack 302 may be attached to the at least one panel 208. Further, the at least one rack 302 extends laterally from the at least one panel 208. Further, the at least one rack 302 may be configured for receiving at least one product. Further, the at least one product may include at least one item.

In further embodiments, at least one first sensor (such as the sensors 116) may be coupled with the at least one rack 302. Further, the at least one first sensor may be communicatively coupled with the at least one display unit 206. Further, the at least one first sensor may be configured for generating first sensor data based on at least one movement of the at least one product in relation to the at least one rack 302. Further, the at least one display unit 206 may be configured for displaying at least one first information based on the first sensor data. Further, the at least one first information may include at least one digital content. Further, the at least one digital content may include at least one of visual content, aural content, and a haptic content. Further, the visual content may include at least one image. Further, the at least one image may include a 2-D image, a 3-D image, etc. Further, the aural content may include at least one sound. Further, the at least one sample may include a voice sample, a music sample, etc.

In further embodiments, at least one light-emitting device 304, as shown in FIG. 3, may be coupled with the at least one rack 302. Further, the at least one light-emitting device 304 may include a light-emitting diode, an incandescent bulb, etc. Further, the at least one light-emitting device 304 may be electrically powered. Further, the at least one light-emitting device 304 receives the electrical power from the at least one electrical power source through the at least one cord hole 220-222. Further, the at least one light-emitting device 304 may be configured for emitting light. Further, the at least one light-emitting device 304 may be configured for illuminating the at least one product based on the emitting.

In further embodiments, at least one input device (such as the mobile device 106, the electronic devices 110, etc.) may be communicatively coupled with the at least one light-emitting device 304 over at least one communication channel. Further, the at least one input device may include a computing device such as, but not limited to, a smartphone, a smartwatch, a laptop, a desktop, a tablet, and so on. Further, the at least one input device may be configured for transmitting at least one command to the at least one input device. Further, the at least one light-emitting device 304 may be configured for emitting the light of at least one intensity based on the at least one command Further, in an embodiment, the at least one panel 208 may include at least one crevice 306-308, as shown in FIG. 3, disposed on at least one first side of the at least one panel 208. Further, the at least one crevice 306-308 extends along a length of the at least one first side of the at least one panel 208. Further, the at least one crevice 306-308 may be configured for attaching the at least one rack 302 to the at least one first side of the at least one panel 208.

In further embodiments, at least one shelf may be coupled to the at least one panel assembly 202. Further, the at least one shelf may be attached to the at least one panel 208. Further, the at least one shelf extends laterally from the at least one panel 208. Further, the at least one shelf may be configured for receiving at least one product.

In further embodiments, at least one second sensor may be communicatively coupled with the at least one display unit 206. Further, the at least one second sensor may be coupled with the at least one shelf. Further, the at least one second sensor may be configured for generating second sensor data based on a physical quantity of the at least one product disposed on the at least one shelf. Further, the physical quantity may include weight, number, volume, etc. Further, the at least one display unit 206 may be configured for displaying at least one second information based on the second sensor data. Further, the at least one information may be associated with the at least one product. Further, the at least one second information may include at least one digital content. Further, the at least one digital content may include at least one of visual content, aural content, and a haptic content. Further, the visual content may include at least one image. Further, the at least one image may include a 2-D image, a 3-D image, etc. Further, the aural content may include at least one sound. Further, the at least one sample may include a voice sample, a music sample, etc.

In further embodiments, at least one point-of-sale (POS) device may be disposed on the at least one panel assembly 202. Further, the at least one POS device may include at least one first scanning device, a processing device, at least one second scanning device, and at least one printer. Further, the at least one first scanning device may be configured for scanning at least one code disposed on the at least one product. Further, the at least one code may include a QR code, etc. Further, the processing device may be communicatively coupled with the at least one first scanning device. Further, the processing device may be configured for analyzing the at least one code. Further, the processing device may be configured for generating a payment request associated with the at least one product based on the at least one code. Further, the processing device may be configured for processing a transaction associated with the payment request based on a payment code. Further, the processing device may be configured for generating at least one receipt based on the processing. Further, the at least one second scanning device may be communicatively coupled with the processing device. Further, the at least one second scanning device may be configured for scanning the payment code associated with the at least one individual based on the payment request. Further, the at least one printer may be communicatively coupled with the processing device. Further, the at least one printer may be configured for printing the at least one receipt based on the generating of the at least one receipt.

In further embodiments, a storage device may be communicatively coupled with the at least one sensor 204 and the at least one display unit 206. Further, the storage device may be configured for retrieving the at least one information based on the sensor data. Further, the displaying of the at least one information may be based on the retrieving.

In further embodiments, the shelf system 200 may include at least one third sensor, a processing device, and a storage device. Further, the at least one third sensor may be configured for generating third sensor data. Further, the third sensor data may be associated at least one of an appearance and a gesture of the at least one individual. Further, the appearance may include a physiological appearance, a physical appearance, etc. Further, the appearance may be associated with a gender, an age, etc. Further, the gesture may include a hand gesture, a body gesture, etc. Further, the processing device may be communicatively coupled with the at least one third sensor. Further, the processing device may be configured for analyzing the third sensor data based on at least one algorithm. Further, the processing device may be configured for determining at least one expression of the at least one individual based on the analyzing of the third sensor data based on the at least one algorithm. Further, the processing device may be configured for generating at least one analytic data associated with the at least one product based on the determining of the at least one expression. Further, the storage device may be communicatively coupled with the processing device and the at least one display unit 206. Further, the storage device may be configured for storing the at least one analytic data. Further, the storage device may be configured for retrieving at least one third information based on the determining of the at least one expression. Further, the at least one display unit 206 may be configured for displaying the at least one third information based on the retrieving.

Further, in an embodiment, the processing device may be configured for analyzing the third sensor data based on at least one first algorithm. Further, the processing device may be configured for determining an identification of the at least one individual based on the analyzing of the third sensor data based on the at least one first algorithm. Further, the generating of the at least one analytic data may be based on the determining of the identification. Further, the retrieving of the at least one third information based on the determining of the identification.

FIG. 3 is a front view of the shelf system 200 for facilitating advertising of a product, in accordance with some embodiments.

Figure 4:
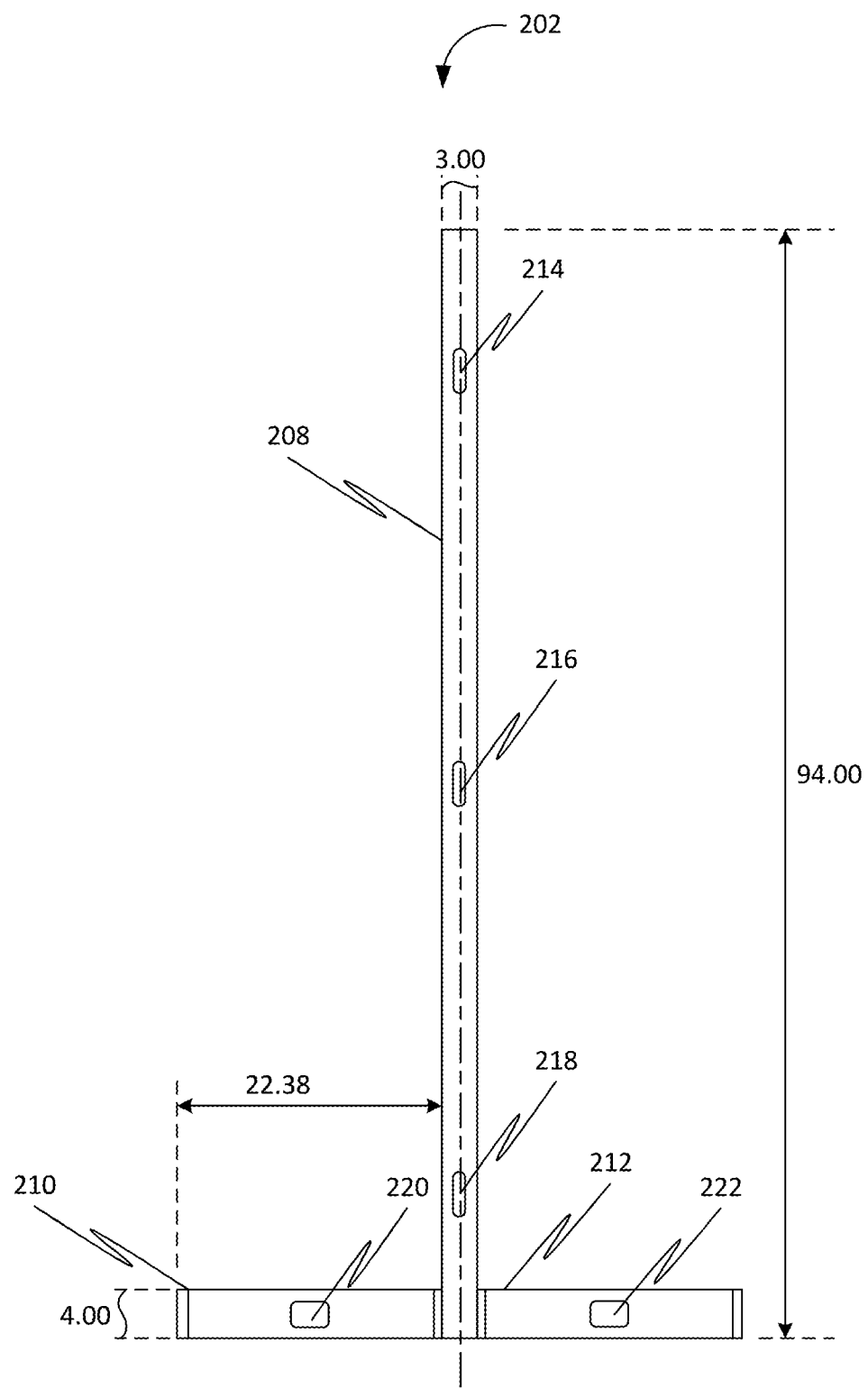
FIG. 4 is a side view of the at least one panel assembly, in accordance with some embodiments.

FIG. 4 is a side view of the at least one panel assembly 202, in accordance with some embodiments.

Figure 5:
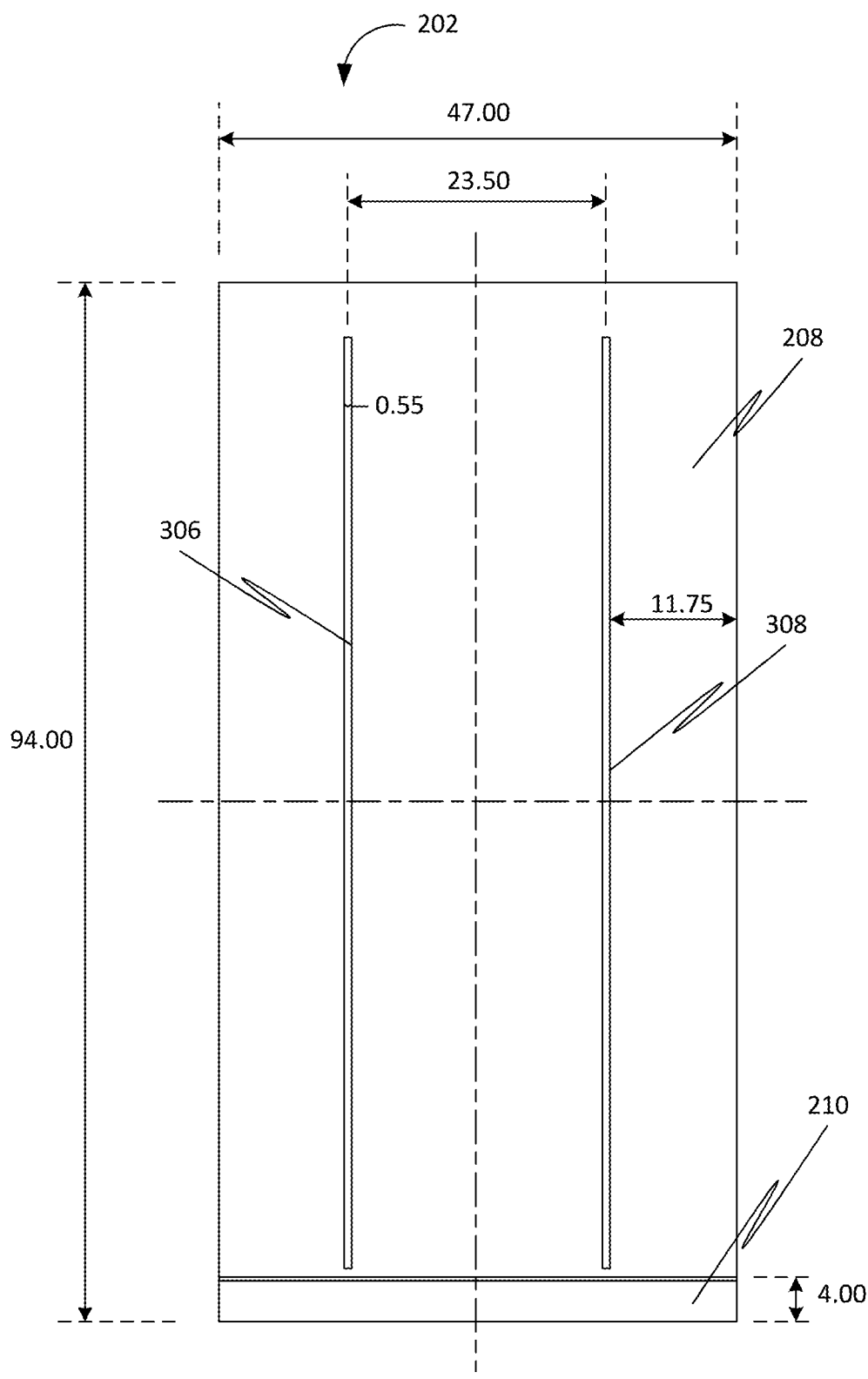
FIG. 5 is a front view of the at least one panel assembly, in accordance with some embodiments.

FIG. 5 is a front view of the at least one panel assembly 202, in accordance with some embodiments.

Figure 6:
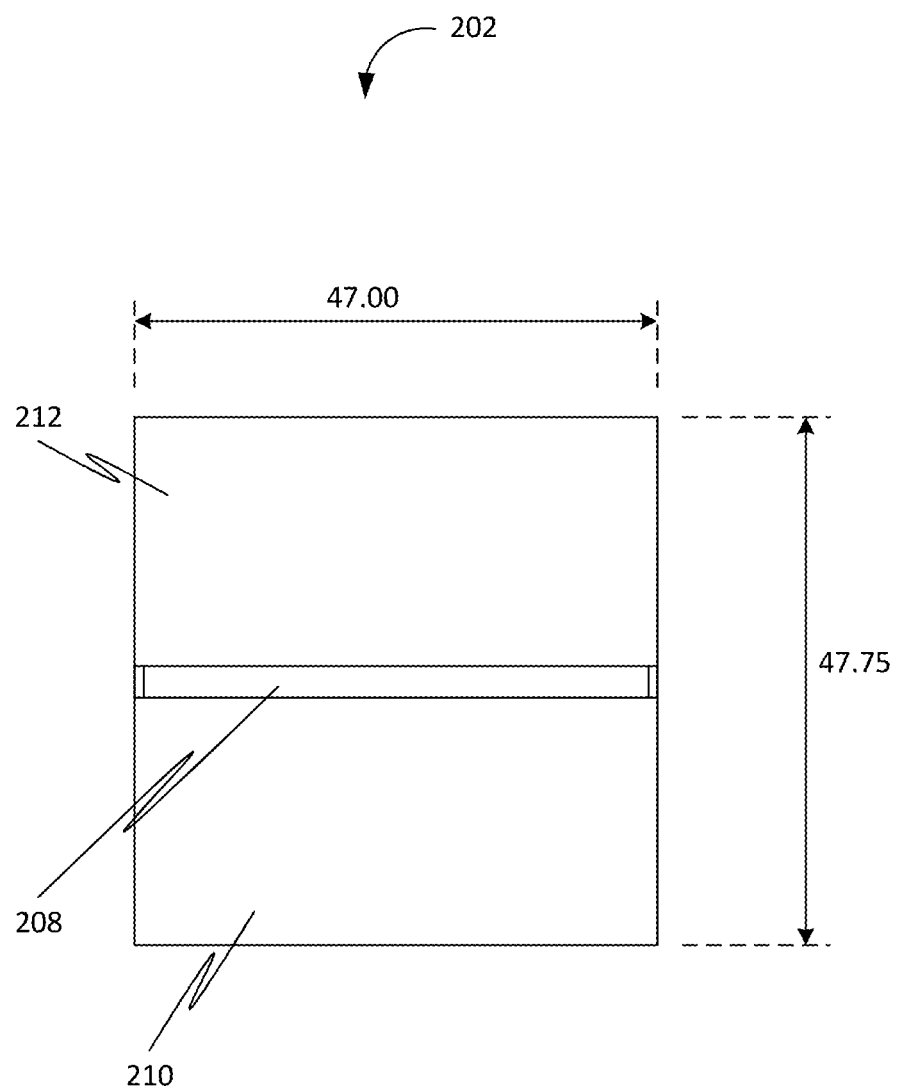
FIG. 6 is a top view of the at least one panel assembly, in accordance with some embodiments.

FIG. 6 is a top view of the at least one panel assembly 202, in accordance with some embodiments.

Figure 7:
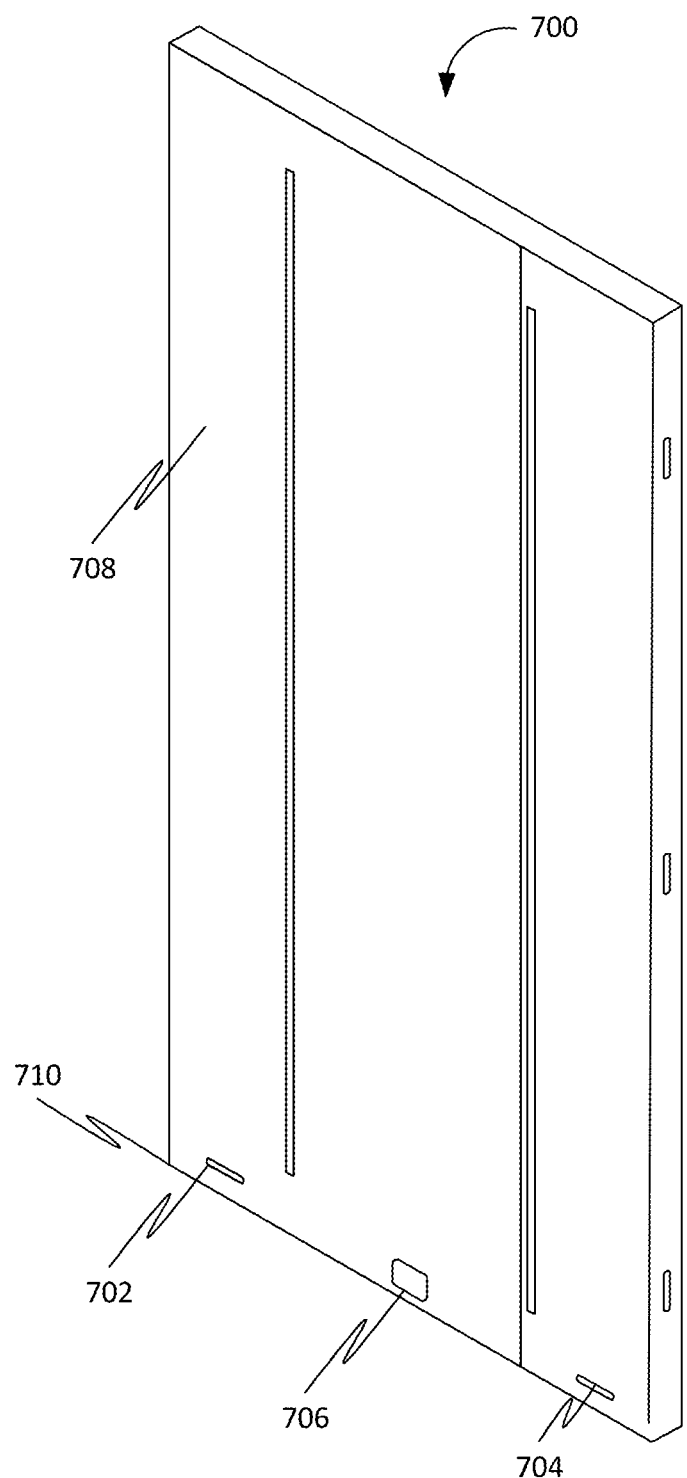
FIG. 7 is a perspective view of a panel, in accordance with some embodiments.

FIG. 7 is a perspective view of a panel 700, in accordance with some embodiments. Further, the panel 700 may include at least one lock mechanism 702-704 and at least one cord hole 706. Further, the at least one lock mechanism 702-704 may include at least one first part and at least one second part. Further, the at least one first part and the at least one cord hole 706 may be disposed on at least one first side 708 of the panel 700 proximal to a first end 710 of the panel 700.

Figure 8:
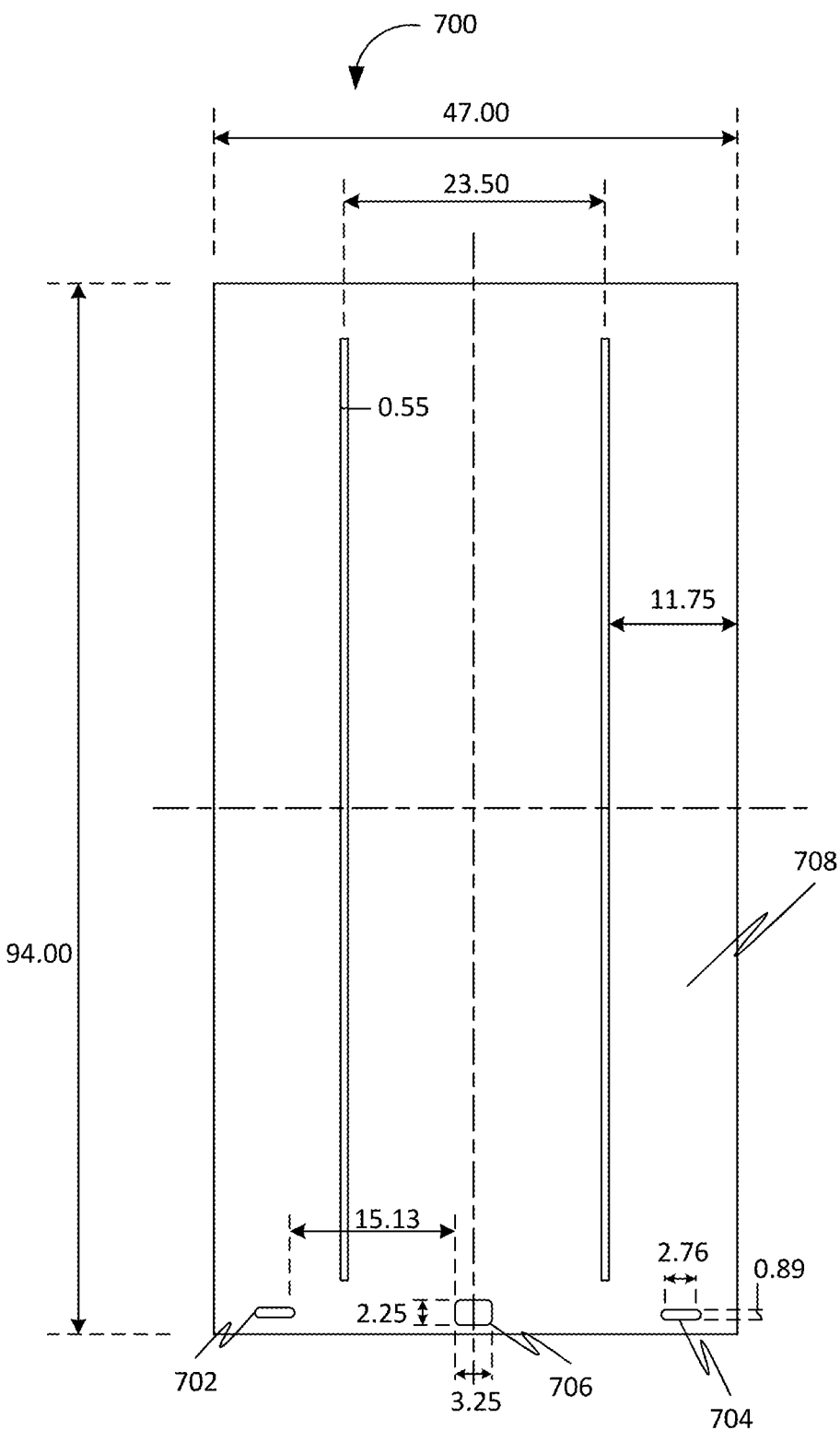
FIG. 8 is a front view of the panel, in accordance with some embodiments.

FIG. 8 is a front view of the panel 700, in accordance with some embodiments.

Figure 9:
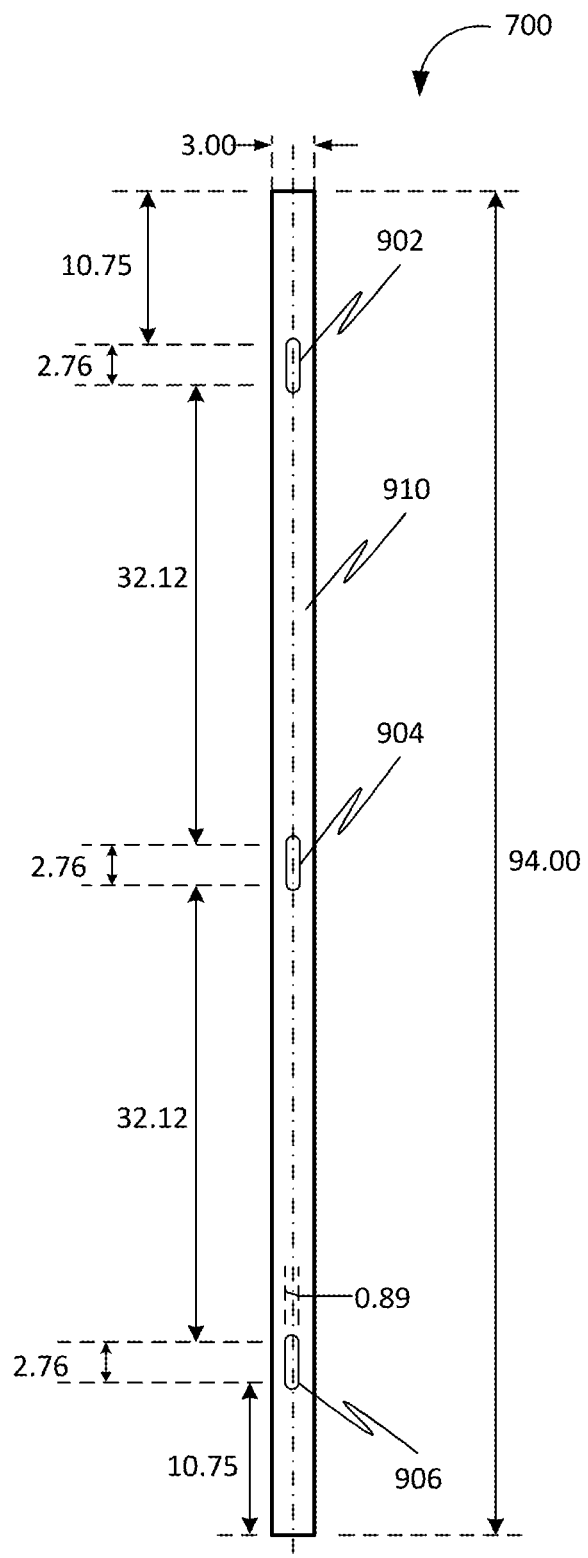
FIG. 9 is a side view of the panel, in accordance with some embodiments.

FIG. 9 is a side view of the panel 700, in accordance with some embodiments.

Further, the panel 700 may include at least one lock mechanism 902-906. Further, the at least one lock mechanism 902-906 may include at least one first part and at least one second part. Further, the at least one first part may be disposed on at least one first side 908 of the panel 700.

Figure 10:
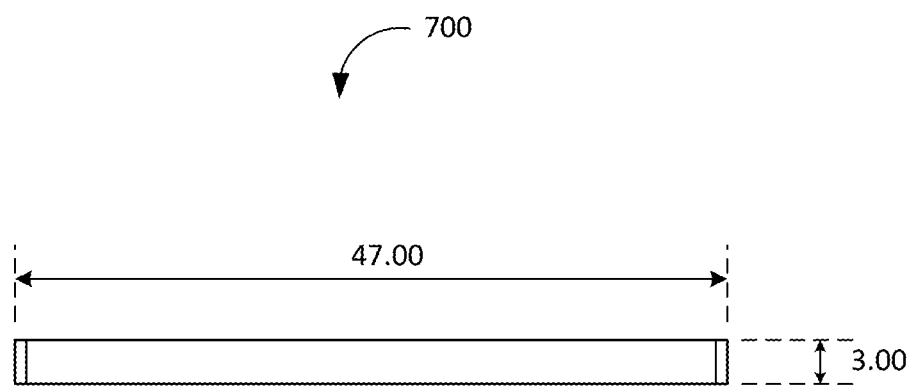
FIG. 10 is a top view of the panel, in accordance with some embodiments.

FIG. 10 is a top view of the panel 700, in accordance with some embodiments.

Figure 11:
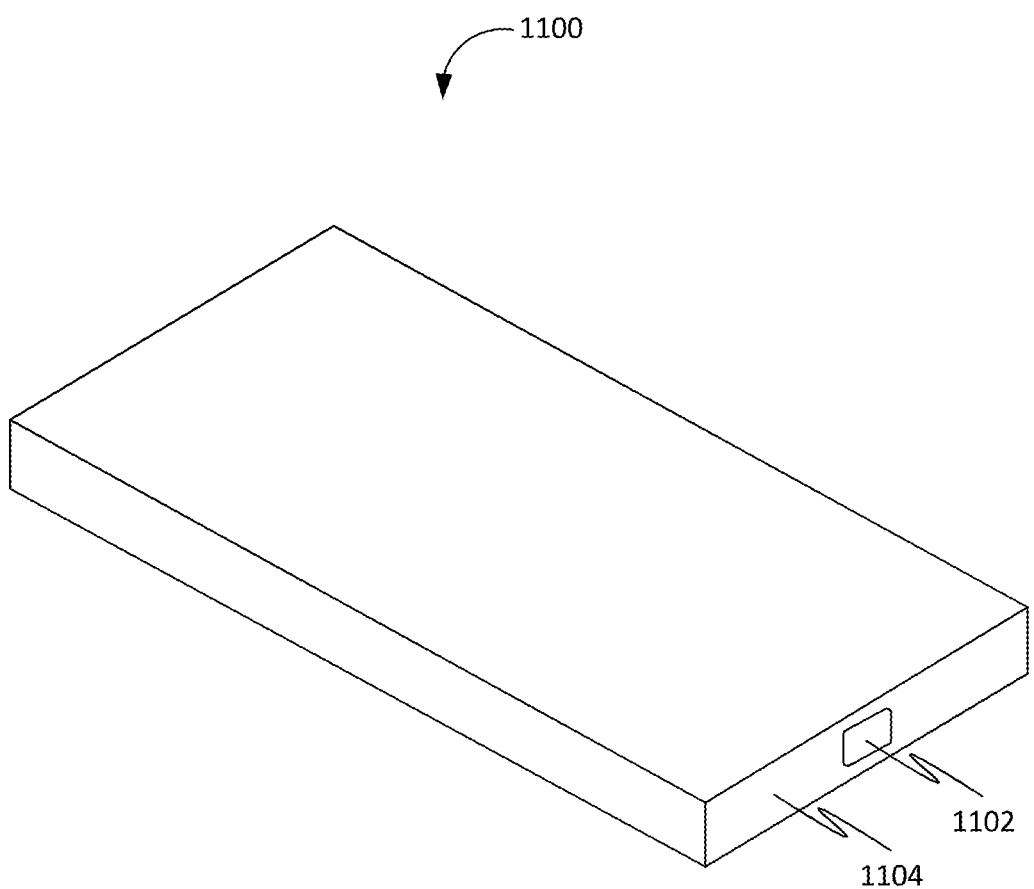
FIG. 11 is a perspective view of a base panel, in accordance with some embodiments.

FIG. 11 is a perspective view of a base panel 1100, in accordance with some embodiments. Further, the base panel 1100 may include at least one cord hole 1102. Further, the at least one cord hole 1102 may be disposed on a side surface 1104 of the base panel 1100.

Figure 12:
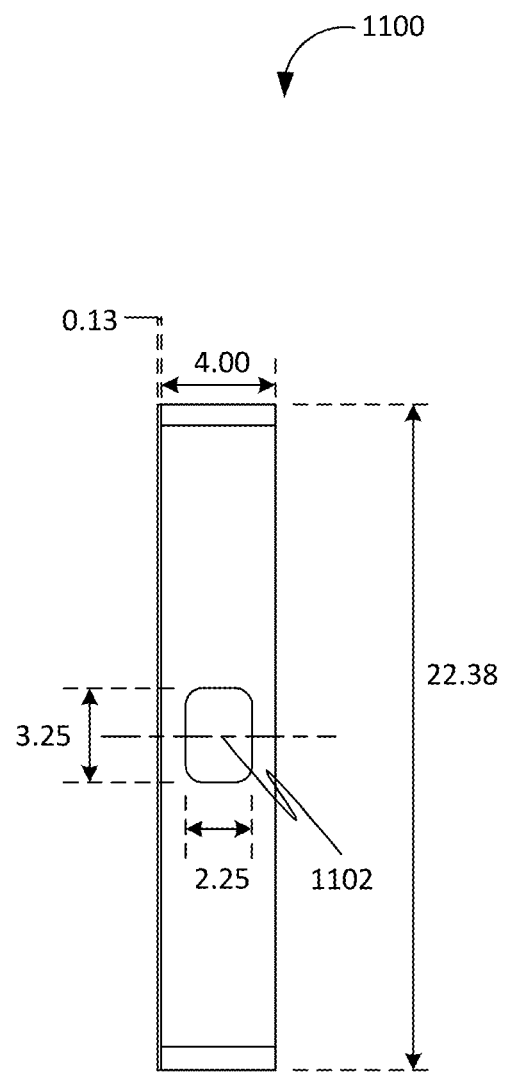
FIG. 12 is a side view of the base panel, in accordance with some embodiments.

FIG. 12 is a side view of the base panel 1100, in accordance with some embodiments.

Figure 13:
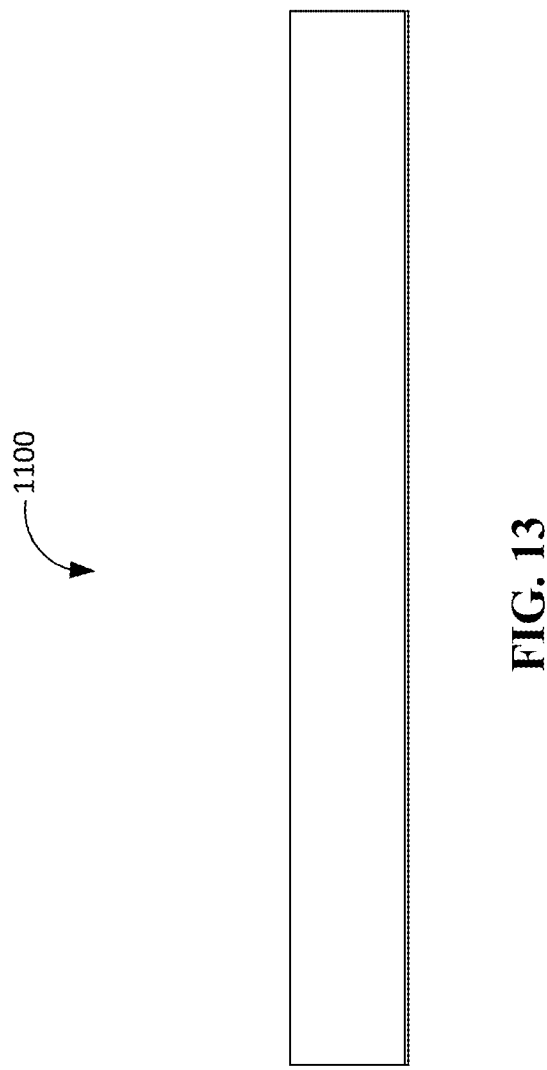
FIG. 13 is a front view of the base panel, in accordance with some embodiments.

FIG. 13 is a front view of the base panel 1100, in accordance with some embodiments.

Figure 14:
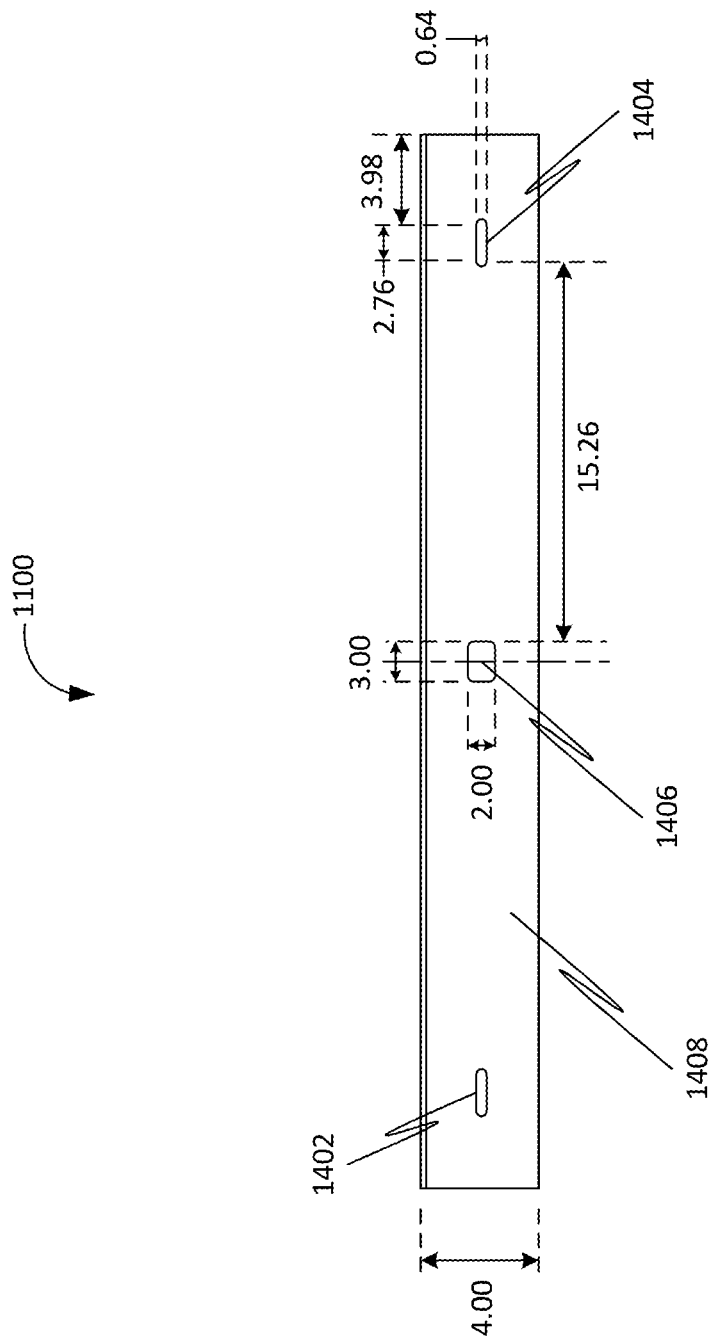
FIG. 14 is a rear view of the base panel, in accordance with some embodiments.

FIG. 14 is a rear view of the base panel 1100, in accordance with some embodiments. Further, the base panel 1100 may include at least one lock mechanism 1402-1404 disposed on a rear surface 1408 of the base panel 1100. Further, the base panel 1100 may include at least one first cord hole 1406 disposed on the rear surface 1408.

Figure 15:
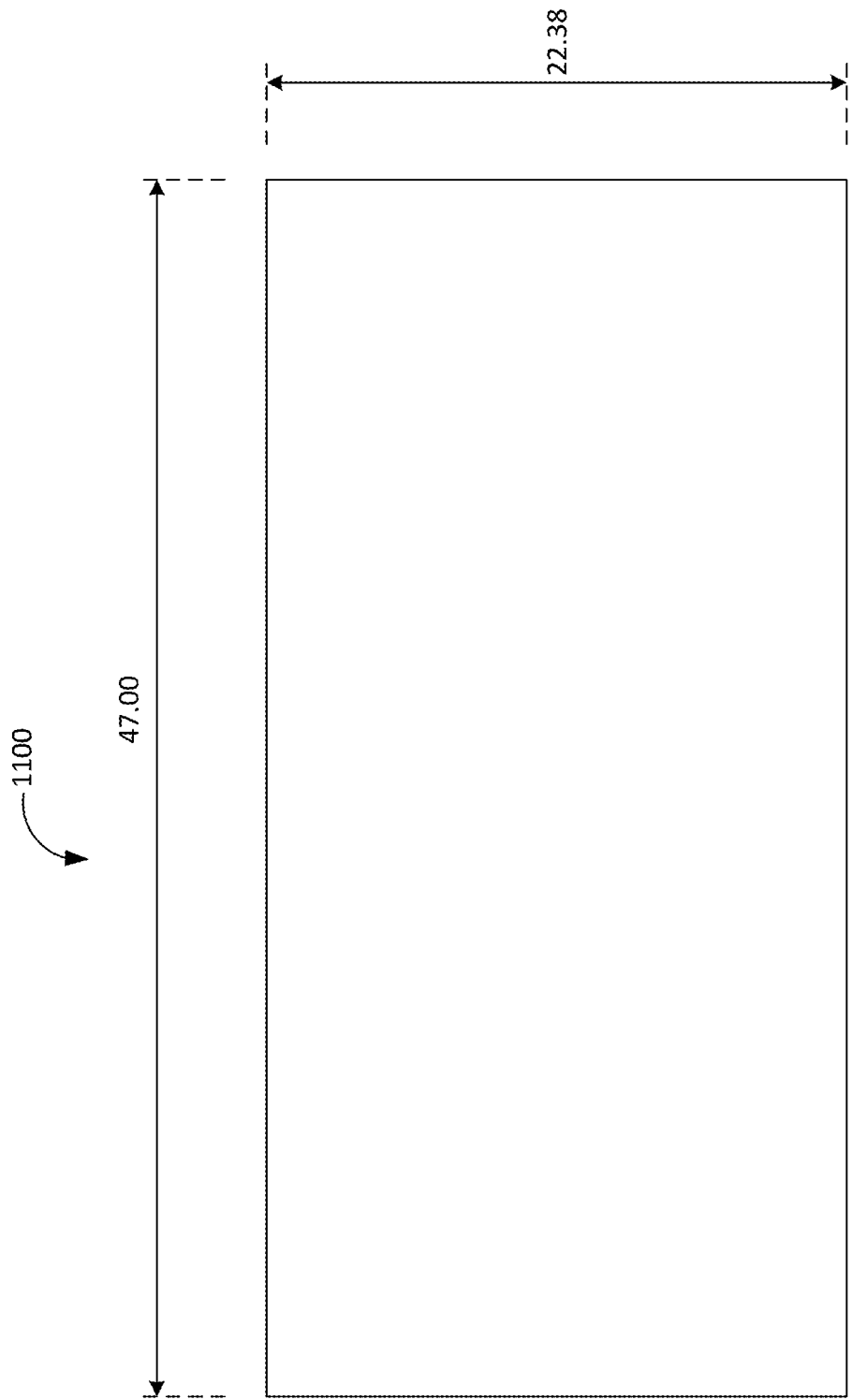
FIG. 15 is a top view of the base panel, in accordance with some embodiments.

FIG. 15 is a top view of the base panel 1100, in accordance with some embodiments.

Figure 16:
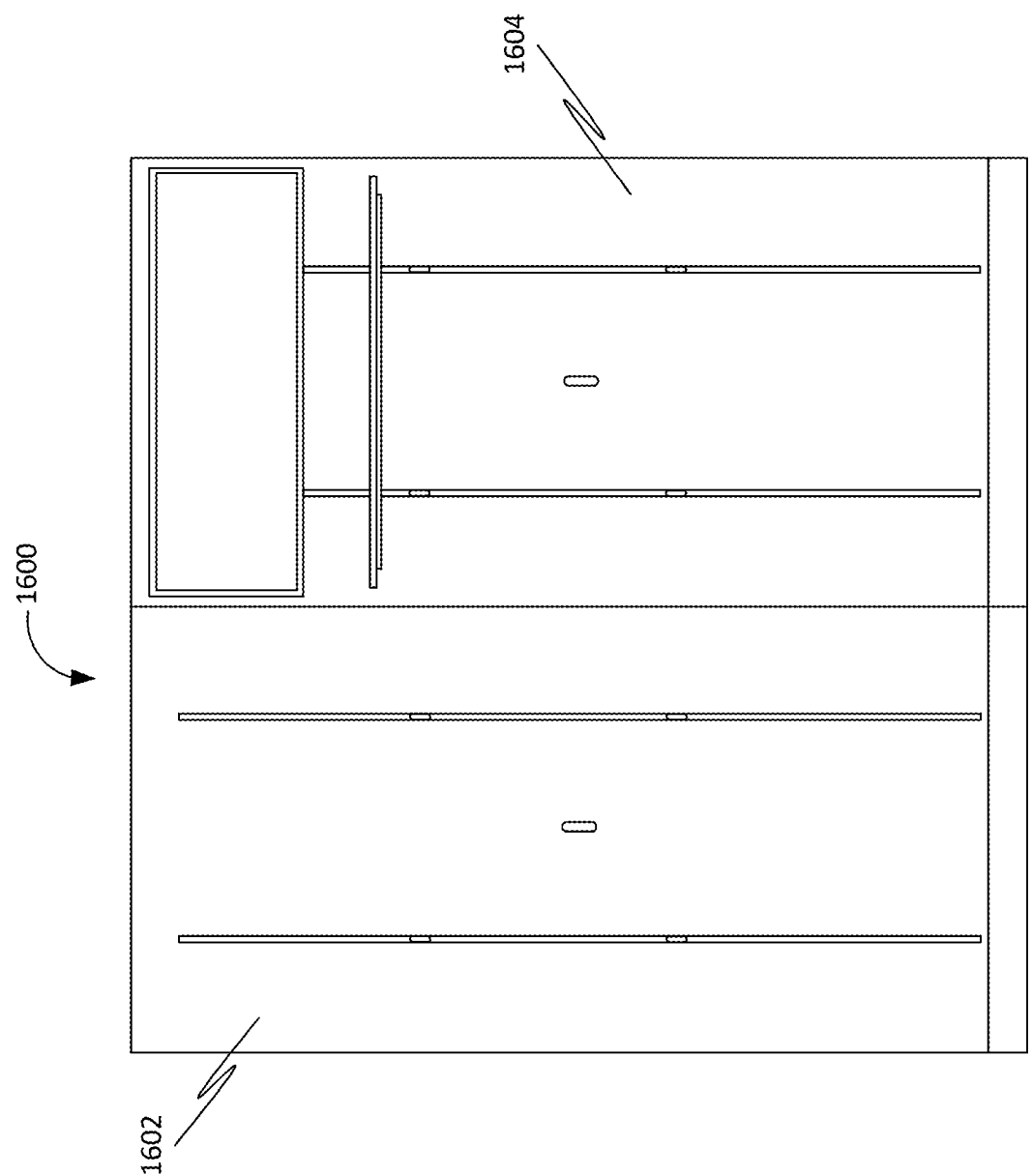
FIG. 16 is a front view of a shelf system for facilitating advertising of a product, in accordance with some embodiments.

FIG. 16 is a front view of a shelf system 1600 for facilitating advertising of a product, in accordance with some embodiments. Further, the shelf system 1600 may include at least one panel assembly, at least one sensor, and at least one display unit. Further, the at least one panel assembly may include at least one base and at least one panel. Further, the at least one panel assembly may include at least one lock mechanism and at least one cord hole. Further, a first panel assembly 1602 of the at least one panel assembly may be couplable to a second panel assembly 1604 of the at least one panel assembly using the at least one lock mechanism and the at least one cord hole forming at least one spatial arrangement. Further, the at least one lock mechanism facilitates securing of the first panel assembly 1602 to the second panel assembly 1604 in the at least one spatial arrangement. Further, the at least one cord hole facilities the transmission of the electrical power between the first panel assembly 1602 and the second panel assembly 1604.

Figure 17:
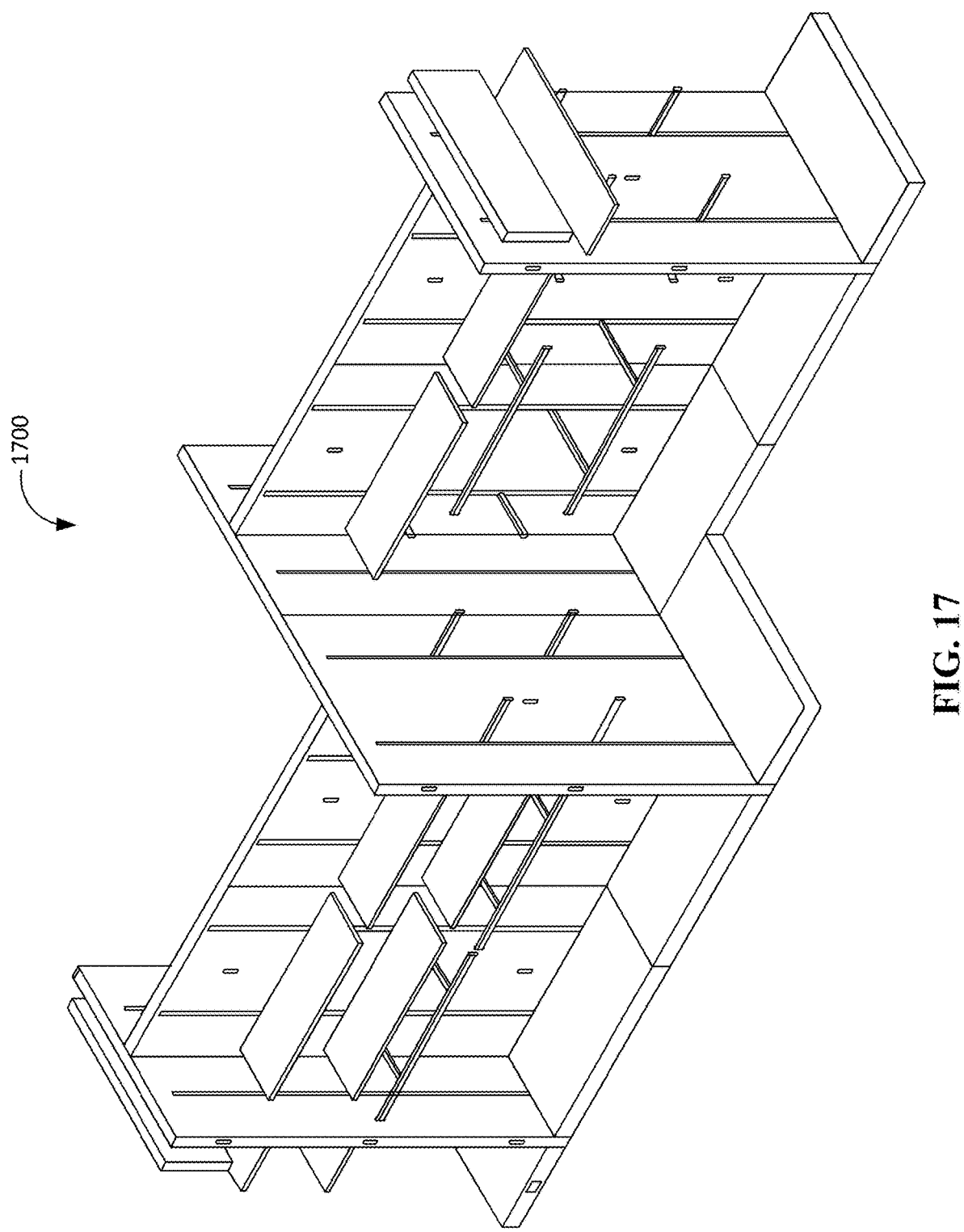
FIG. 17 is a perspective view of a shelf system for facilitating advertising of a product, in accordance with some embodiments.

FIG. 17 is a perspective view of a shelf system 1700 for facilitating advertising of a product, in accordance with some embodiments.

Figure 18:
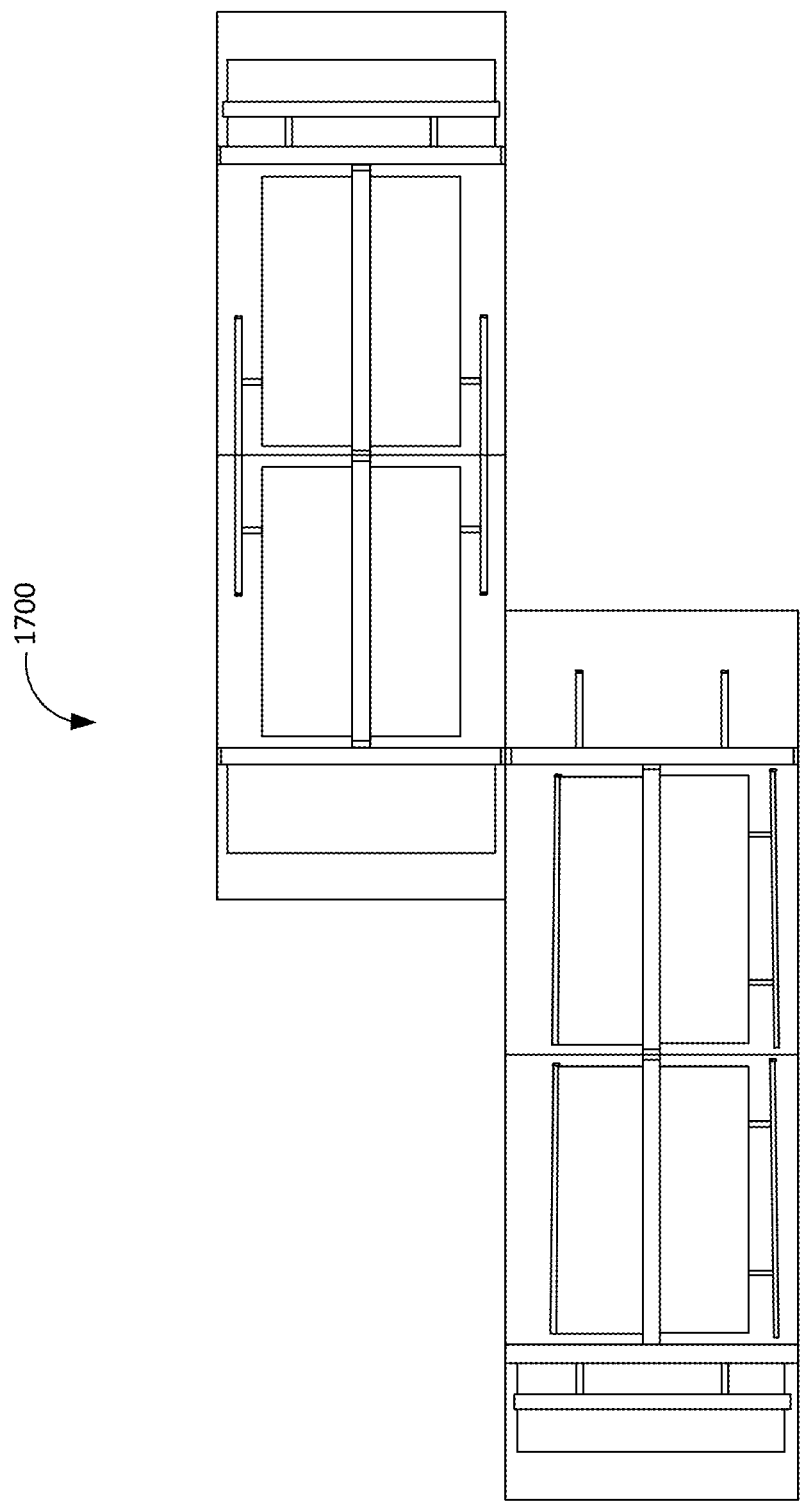
FIG. 18 is a top view of the shelf system, in accordance with some embodiments.

FIG. 18 is a top view of the shelf system 1700, in accordance with some embodiments.

Figure 19:
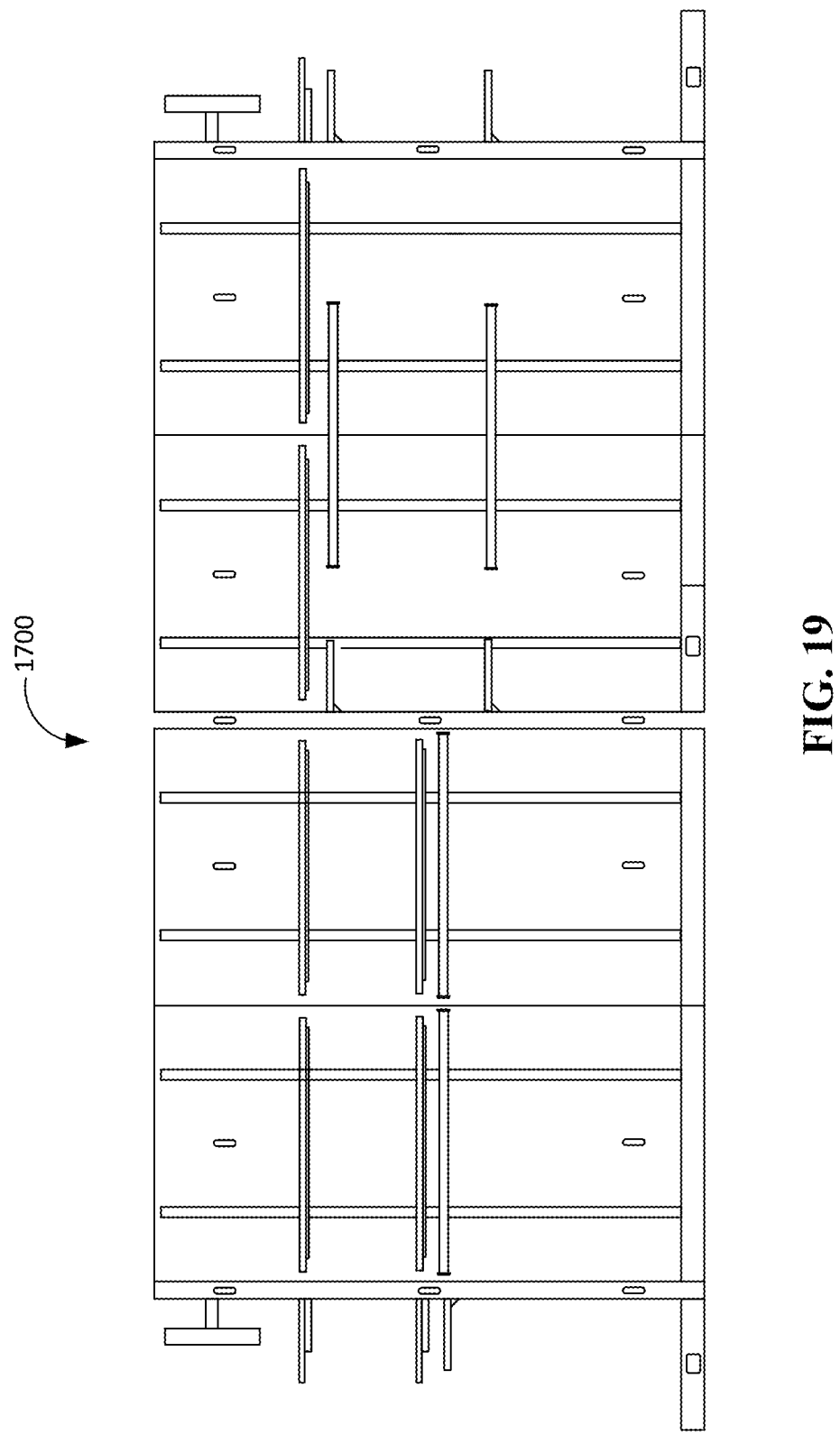
FIG. 19 is a side view of the shelf system, in accordance with some embodiments.

FIG. 19 is a side view of the shelf system 1700, in accordance with some embodiments.

Figure 20:
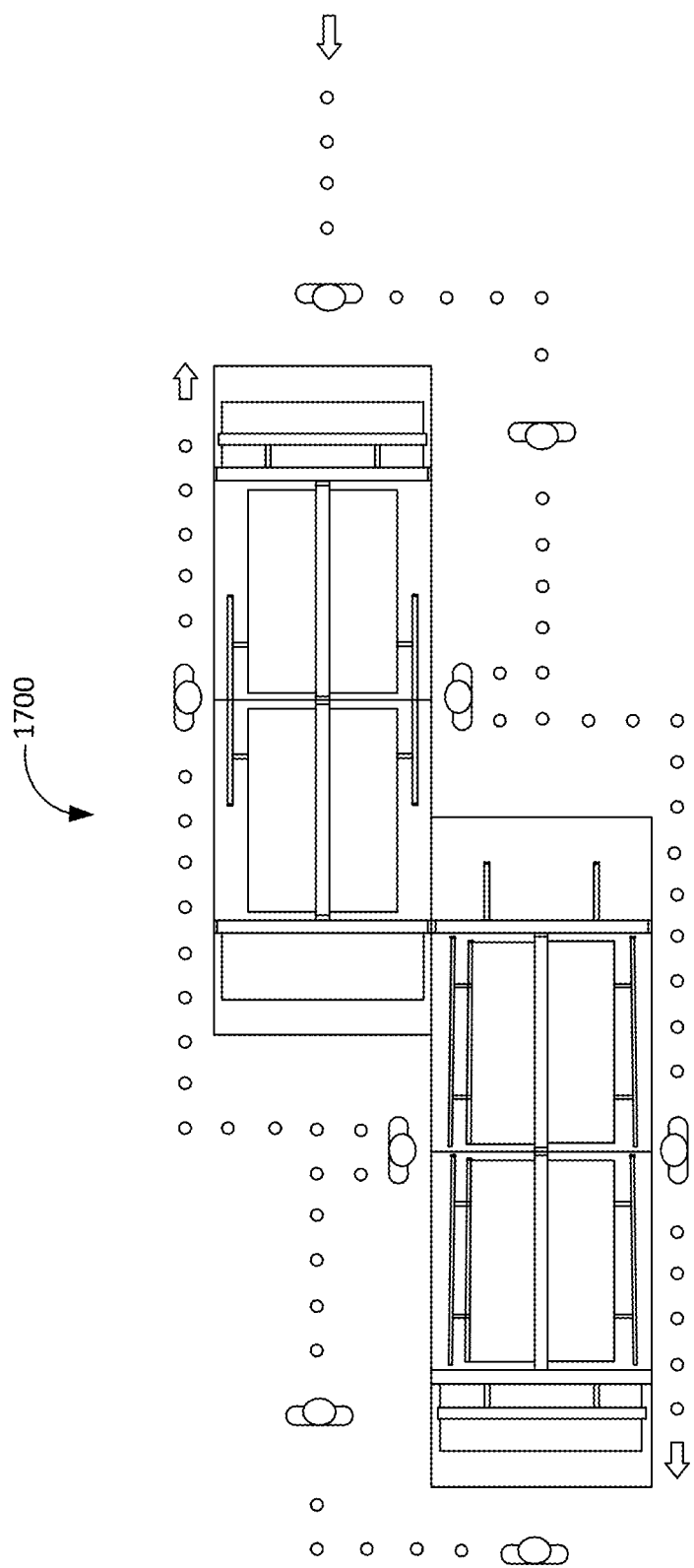
FIG. 20 is a top view of the shelf system with a pathway for consumers, in accordance with some embodiments.

FIG. 20 is a top view of the shelf system 1700 with a pathway for consumers, in accordance with some embodiments. Further, the consumer may include at least one individual.

Figure 21:
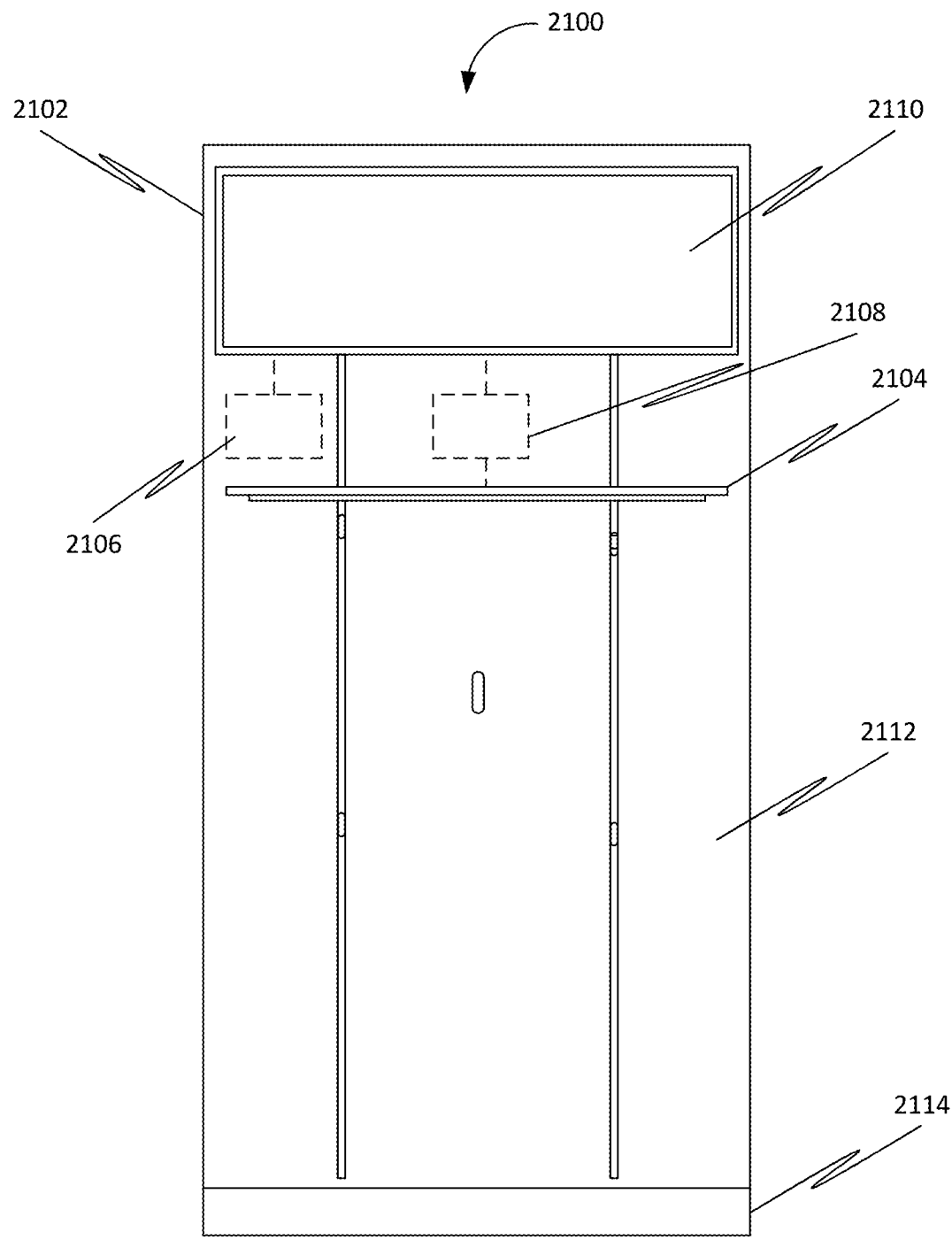
FIG. 21 is a front view of a shelf system for facilitating advertising of a product, in accordance with some embodiments.

FIG. 21 is a front view of a shelf system 2100 for facilitating advertising of a product, in accordance with some embodiments. Further, the shelf system 2100 may include at least one panel assembly 2102, at least one rack 2104, at least one sensor 2106, at least one first sensor 2108, and at least one display unit 2110.

Further, the at least one panel assembly 2102 may include at least one base 2114 and at least one panel 2112. Further, the at least one panel 2112 may be vertically disposable in relation to the at least one base 2114. Further, the at least one panel assembly 2102 may include at least one lock mechanism and at least one cord hole. Further, the at least one lock mechanism and the at least one cord hole may be disposed on the at least one panel 2112 and the at least one base 2114. Further, the at least one panel 2112 may be couplable with the at least one base 2114 using the at least one lock mechanism and the at least one cord hole. Further, the at least one lock mechanism facilitates securing of the at least one panel 2112 to the at least one base 2114. Further, the at least one cord hole facilitates transmission of an electrical power between the at least one panel 2112 and the at least one base 2114. Further, a first panel assembly of the at least one panel assembly 2102 may be couplable to a second panel assembly of the at least one panel assembly 2102 using the at least one lock mechanism and the at least one cord hole forming at least one spatial arrangement. Further, the at least one lock mechanism facilitates securing of the first panel assembly to the second panel assembly in the at least one spatial arrangement. Further, the at least one cord hole facilities the transmission of the electrical power between the first panel assembly and the second panel assembly.

Further, the at least one rack 2104 coupled to the at least one panel assembly 2102. Further, the at least one rack 2104 may be attached to the at least one panel 2112. Further, the at least one rack 2104 extends laterally from the at least one panel 2112. Further, the at least one rack 2104 may be configured for receiving at least one product.

Further, the at least one sensor 2106 disposed on the at least one panel assembly 2102. Further, the at least one sensor 2106 may be configured for generating sensor data based on a position of at least one individual in relation to the at least one panel assembly 2102.

Further, the at least one first sensor 2108 coupled with the at least one rack 2104. Further, the at least one first sensor 2108 may be configured for generating first sensor data based on at least one movement of the at least one product in relation to the at least one rack 2104.

Further, the at least one display unit 2110 disposed on the at least one panel assembly 2102. Further, the at least one display unit 2110 may be electrically powered. Further, the at least one display unit 2110 receives the electrical power from at least one electrical power source through the at least one cord hole. Further, the at least one display unit 2110 may be communicatively coupled with the at least one sensor 2106 and the at least one first sensor 2108. Further, the at least one display unit 2110 may be configured for displaying at least one information based on the sensor data. Further, the at least one display unit 2110 may be configured for displaying at least one first information based on the first sensor data.

Further, in some embodiments, the at least one lock mechanism may include at least one first part and at least one second part. Further, the at least one first part may be disposed on at least one first side of the at least one panel 2112 proximal to a first end of the at least one panel 2112. Further, the at least one second part may be disposed on a first side of the at least one base 2114. Further, the at least one first part may be configured for receiving the at least one second part. Further, the at least one first part may be couplable to the at least one second part for facilitating securing of the at least one first side of the at least one panel 2112 to the first side of the at least one base 2114.

Further, in some embodiments, the at least one cord hole may include at least one first cord hole and at least one second cord hole. Further, the at least one first cord hole may be disposed on at least one first side of the at least one panel 2112 proximal to a first end of the at least one panel 2112. Further, the at least one second cord hole may be disposed on a first side of the at least one base 2114. Further, the at least one first cord hole may be couplable with the at least one second cord hole for facilitating the transmission of the electrical power between the at least one base 2114 and the at least one panel 2112.

In further embodiments, at least one light-emitting device coupled with the at least one rack 2104. Further, the at least one light-emitting device may be electrically powered. Further, the at least one light-emitting device receives the electrical power from the at least one electrical power source through the at least one cord hole. Further, the at least one light-emitting device may be configured for emitting light. Further, the at least one light-emitting device may be configured for illuminating the at least one product based on the emitting.

Figure 22:
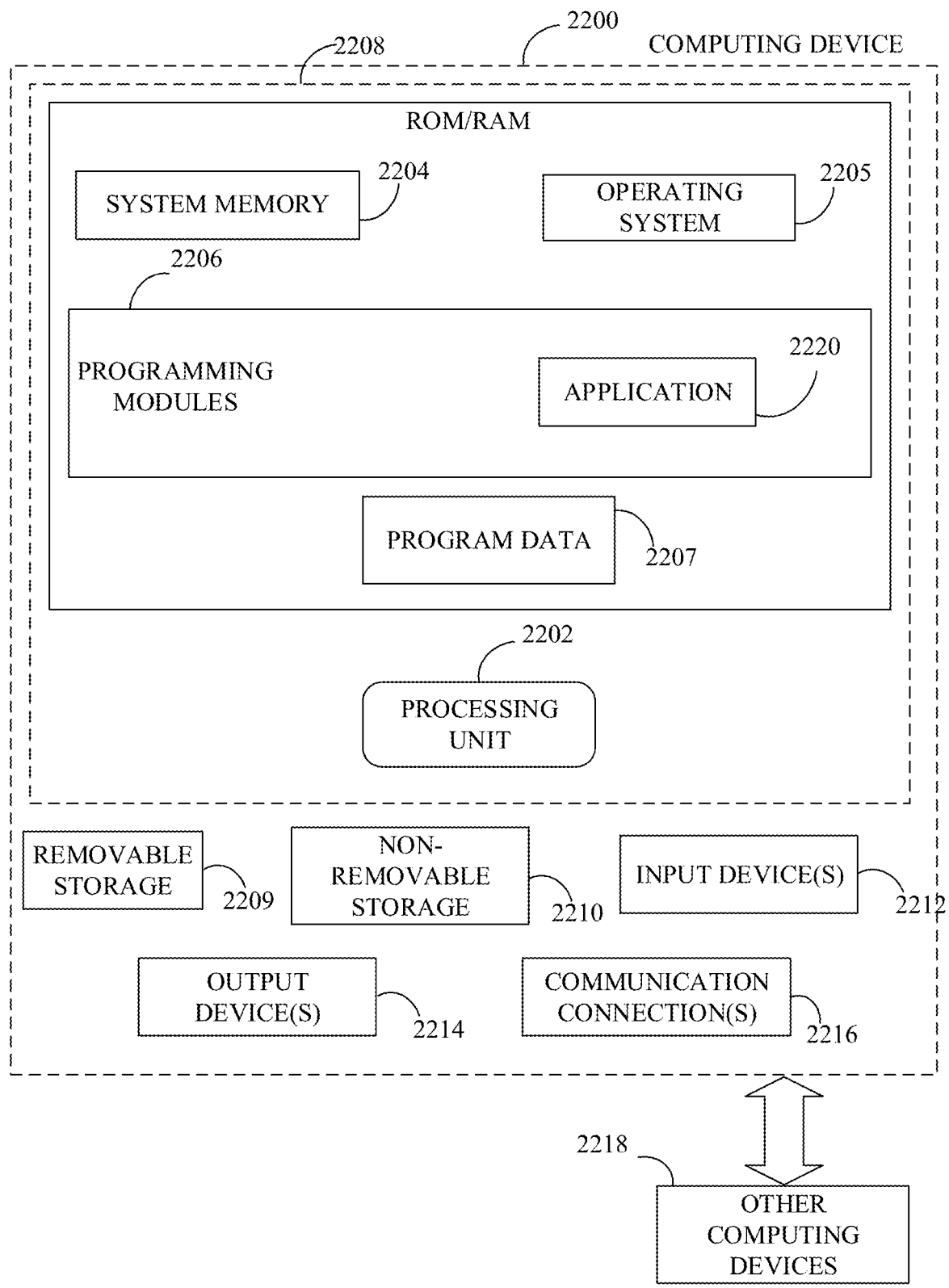
FIG. 22 is a block diagram of a computing device for implementing the methods disclosed herein, in accordance with some embodiments.

With reference to FIG. 22, a system consistent with an embodiment of the disclosure may include a computing device or cloud service, such as computing device 2200. In a basic configuration, computing device 2200 may include at least one processing unit 2202 and a system memory 2204. Depending on the configuration and type of computing device, system memory 2204 may comprise, but is not limited to, volatile (e.g. random-access memory (RAM)), non-volatile (e.g. read-only memory (ROM)), flash memory, or any combination. System memory 2204 may include operating system 2205, one or more programming modules 2206, and may include a program data 2207. Operating system 2205, for example, may be suitable for controlling computing device 2200's operation. In one embodiment, programming modules 2206 may include an image-processing module, machine learning module. Furthermore, embodiments of the disclosure may be practiced in conjunction with a graphics library, other operating systems, or any other application program and is not limited to any particular application or system. This basic configuration is illustrated in FIG. 22 by those components within a dashed line 2208.

Computing device 2200 may have additional features or functionality. For example, computing device 2200 may also include additional data storage devices (removable and/or non-removable) such as, for example, magnetic disks, optical disks, or tape. Such additional storage is illustrated in FIG. 22 by a removable storage 2209 and a non-removable storage 2210. Computer storage media may include volatile and non-volatile, removable and non-removable media implemented in any method or technology for storage of information, such as computer-readable instructions, data structures, program modules, or other data. System memory 2204, removable storage 2209, and non-removable storage 2210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2200. Any such computer storage media may be part of device 2200. Computing device 2200 may also have input device(s) 2212 such as a keyboard, a mouse, a pen, a sound input device, a touch input device, a location sensor, a camera, a biometric sensor, etc. Output device(s) 2214 such as a display, speakers, a printer, etc. may also be included. The aforementioned devices are examples and others may be used.

Computing device 2200 may also contain a communication connection 2216 that may allow device 2200 to communicate with other computing devices 2218, such as over a network in a distributed computing environment, for example, an intranet or the Internet. Communication connection 2216 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 2204, including operating system 2205. While executing on processing unit 2202, programming modules 2206 (e.g., application 2220 such as a media player) may perform processes including, for example, one or more stages of methods, algorithms, systems, applications, servers, databases as described above. The aforementioned process is an example, and processing unit 2202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 23:
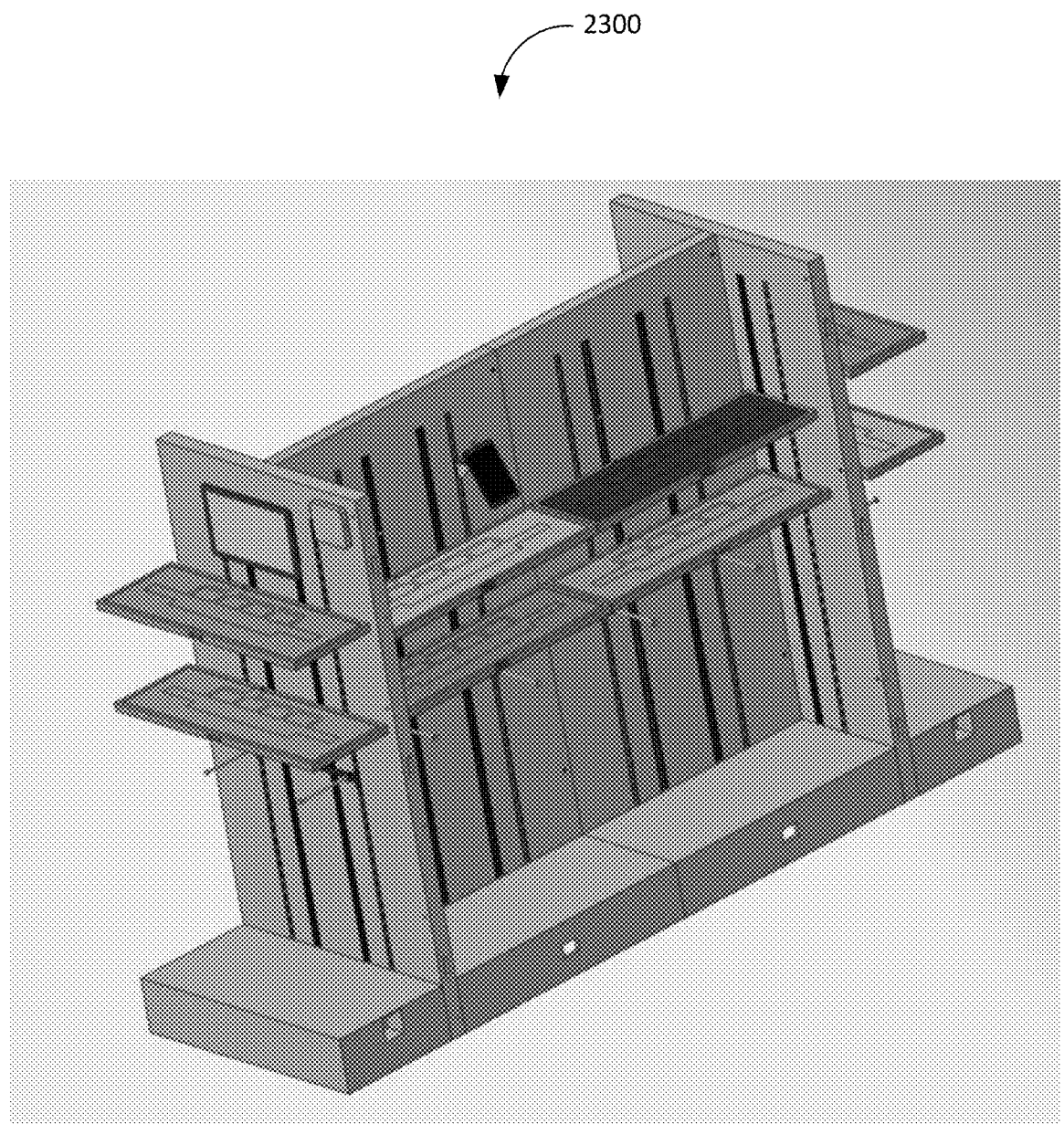
FIG. 23 is an illustration of a shelf system for facilitating advertising of a product, in accordance with some embodiments.

FIG. 23 is an illustration of a shelf system 2300 for facilitating advertising of a product, in accordance with some embodiments.

Figure 24:
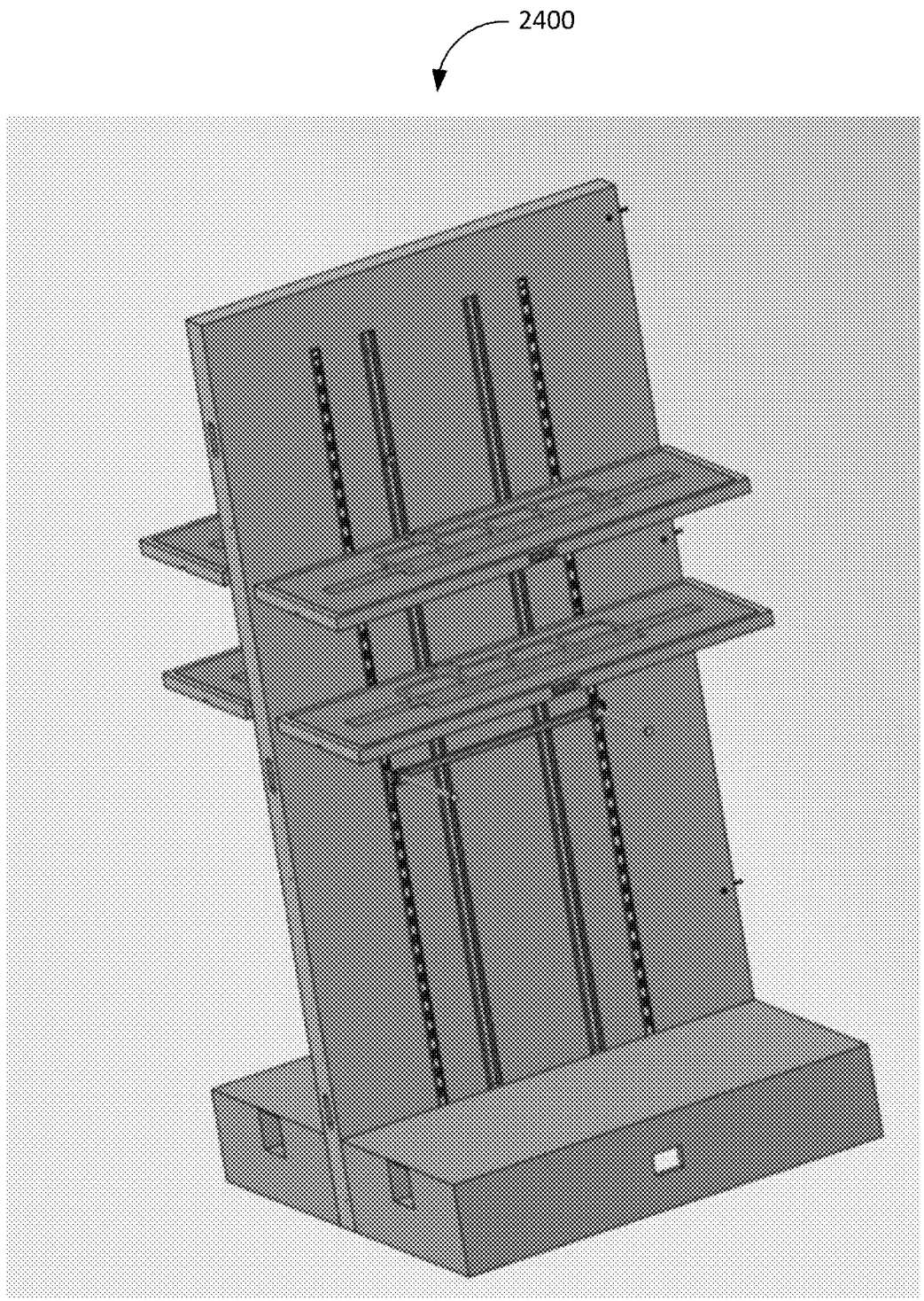
FIG. 24 is an illustration of a shelf system for facilitating advertising of a product, in accordance with some embodiments.

FIG. 24 is an illustration of a shelf system 2400 for facilitating advertising of a product, in accordance with some embodiments.

Figure 25:
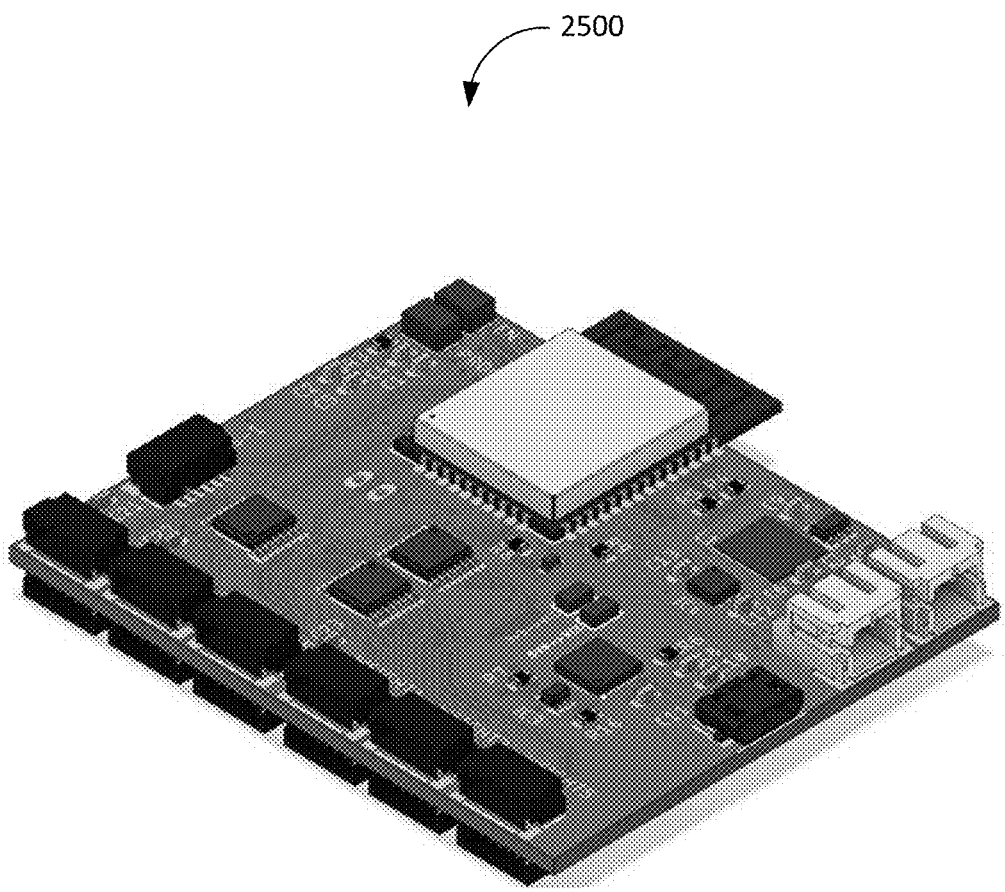
FIG. 25 is an illustration of a PCB (printed circuit board) of a shelf system for facilitating advertising of a product, in accordance with some embodiments.

FIG. 25 is an illustration of a PCB (printed circuit board) 2500 of a shelf system for facilitating advertising of a product, in accordance with some embodiments. Further, the PCB 2500 may be embedded into shelves of the shelf system. Further, the PCB 2500 may accommodate 6 RFID, 6 Load cell, and a sonic sensor and touch sensor to provide different customer interactions and experiences. Further, the PCB 2500 may be configured to communicate to a server application hosted remotely and pull product information of the product to display to a customer using at least one display unit of the shelf system. Further, the PCB 2500 may include a Lithium Iron Phosphate battery that may charge and supply power to power electronics for over 10 hours. Further, the Lithium Iron Phosphate battery may supply power to at least five panel assemblies of the shelf system. Further, the at least five panel assemblies may be connected in series.

Although the present disclosure has been explained in relation to its preferred embodiment, it is to be understood that many other possible modifications and variations can be made without departing from the spirit and scope of the disclosure.

The following is claimed:

1. A shelf system for facilitating advertising of a product, the shelf system comprising:
   at least one panel assembly comprising at least one base and at least one panel, wherein the at least one panel is vertically disposable in relation to the at least one base, wherein the at least one panel assembly comprises at least one lock mechanism and at least one cord hole, wherein the at least one lock mechanism and the at least one cord hole is disposed on the at least one panel and the at least one base, wherein the at least one panel is couplable with the at least one base using the at least one lock mechanism and the at least one cord hole, wherein the at least one lock mechanism facilitates securing of the at least one panel to the at least one base, wherein the at least one cord hole facilitates transmission of an electrical power between the at least one panel and the at least one base, wherein a first panel assembly of the at least one panel assembly is couplable to a second panel assembly of the at least one panel assembly using the at least one lock mechanism and the at least one cord hole forming at least one spatial arrangement, wherein the at least one lock mechanism facilitates securing of the first panel assembly to the second panel assembly in the at least one spatial arrangement, wherein the at least one cord hole facilities the transmission of the electrical power between the first panel assembly and the second panel assembly;
   at least one sensor disposed on the at least one panel assembly, wherein the at least one sensor is configured for generating sensor data based on a position of at least one individual in relation to the at least one panel assembly; and
   at least one display unit disposed on the at least one panel assembly, wherein the at least one display unit is electrically powered, wherein the at least one display unit receives the electrical power from at least one electrical power source through the at least one cord hole, wherein the at least one display unit is communicatively coupled with the at least one sensor, wherein the at least one display unit is configured for displaying at least one information based on the sensor data.

2. The shelf system of claim 1, wherein the at least one cord hole comprises at least one primary cord hole and at least one secondary cord hole, wherein the at least one primary cord hole is disposed on at least one primary side of at least one first base of the first panel assembly, wherein the at least one secondary cord hole is disposed on at least one secondary side of at least one second base of the second panel assembly, wherein the at least one primary cord hole is couplable with the at least one secondary cord hole for facilitating transmission of the electrical power between the first panel assembly and the second panel assembly.

3. The shelf system of claim 1 further comprising at least one rack coupled to the at least one panel assembly, wherein the at least one rack is attached to the at least one panel, wherein the at least one rack extends laterally from the at least one panel, wherein the at least one rack is configured for receiving at least one product.

4. The shelf system of claim 3 further comprising at least one first sensor coupled with the at least one rack, wherein the at least one first sensor is communicatively coupled with the at least one display unit, wherein the at least one first sensor is configured for generating first sensor data based on at least one movement of the at least one product in relation to the at least one rack, wherein the at least one display unit is configured for displaying at least one first information based on the first sensor data.

5. The shelf system of claim 3 further comprising at least one light-emitting device coupled with the at least one rack, wherein the at least one light-emitting device is electrically powered, wherein the at least one light-emitting device receives the electrical power from the at least one electrical power source through the at least one cord hole, wherein the at least one light-emitting device is configured for emitting light, wherein the at least one light-emitting device is configured for illuminating the at least one product based on the emitting.

6. The shelf system of claim 5 further comprising at least one input device communicatively coupled with the at least one light-emitting device over at least one communication channel, wherein the at least one input device is configured for transmitting at least one command to the at least one input device, wherein the at least one light-emitting device is configured for emitting the light of at least one intensity based on the at least one command.

7. The shelf system of claim 3, wherein the at least one panel comprises at least one crevice disposed on at least one first side of the at least one panel, wherein the at least one crevice extends along a length of the at least one first side of the at least one panel, wherein the at least one crevice is configured for attaching the at least one rack to the at least one first side of the at least one panel.

8. The shelf system of claim 1 further comprising at least one shelf coupled to the at least one panel assembly, wherein the at least one shelf is attached to the at least one panel, wherein the at least one shelf extends laterally from the at least one panel, wherein the at least one shelf is configured for receiving at least one product.

9. The shelf system of claim 8 further comprising at least one second sensor communicatively coupled with the at least one display unit, wherein the at least one second sensor is coupled with the at least one shelf, wherein the at least one second sensor is configured for generating second sensor data based on a physical quantity of the at least one product disposed on the at least one shelf, wherein the at least one display unit is configured for displaying at least one second information based on the second sensor data.

10. The shelf system of claim 1 further comprising a storage device communicatively coupled with the at least one sensor and the at least one display unit, wherein the storage device is configured for retrieving the at least one information based on the sensor data, wherein the displaying of the at least one information is based on the retrieving.

11. A shelf system for facilitating advertising of a product, the shelf system comprising:
  at least one panel assembly comprising at least one base and at least one panel, wherein the at least one panel is vertically disposable in relation to the at least one base, wherein the at least one panel assembly comprises at least one lock mechanism and at least one cord hole, wherein the at least one lock mechanism and the at least one cord hole is disposed on the at least one panel and the at least one base, wherein the at least one panel is couplable with the at least one base using the at least one lock mechanism and the at least one cord hole, wherein the at least one lock mechanism facilitates securing of the at least one panel to the at least one base, wherein the at least one cord hole facilitates transmission of an electrical power between the at least one panel and the at least one base, wherein a first panel assembly of the at least one panel assembly is couplable to a second panel assembly of the at least one panel assembly using the at least one lock mechanism and the at least one cord hole forming at least one spatial arrangement, wherein the at least one lock mechanism facilitates securing of the first panel assembly to the second panel assembly in the at least one spatial arrangement, wherein the at least one cord hole facilities the transmission of the electrical power between the first panel assembly and the second panel assembly;
  at least one rack coupled to the at least one panel assembly, wherein the at least one rack is attached to the at least one panel, wherein the at least one rack extends laterally from the at least one panel, wherein the at least one rack is configured for receiving at least one product;
  at least one sensor disposed on the at least one panel assembly, wherein the at least one sensor is configured for generating sensor data based on a position of at least one individual in relation to the at least one panel assembly;
  at least one first sensor coupled with the at least one rack, wherein the at least one first sensor is configured for generating first sensor data based on at least one movement of the at least one product in relation to the at least one rack; and
  at least one display unit disposed on the at least one panel assembly, wherein the at least one display unit is electrically powered, wherein the at least one display unit receives the electrical power from at least one electrical power source through the at least one cord hole, wherein the at least one display unit is communicatively coupled with the at least one sensor and the at least one first sensor, wherein the at least one display unit is configured for:
    displaying at least one information based on the sensor data; and
    displaying at least one first information based on the first sensor data.

12. The shelf system of claim 11 further comprising at least one light-emitting device coupled with the at least one rack, wherein the at least one light-emitting device is electrically powered, wherein the at least one light-emitting device receives the electrical power from the at least one electrical power source through the at least one cord hole, wherein the at least one light-emitting device is configured for emitting light, wherein the at least one light-emitting device is configured for illuminating the at least one product based on the emitting.

\* \* \* \* \*